(12) United States Patent
Liu et al.

(10) Patent No.: US 11,920,725 B2
(45) Date of Patent: Mar. 5, 2024

(54) CALIBRATION SYSTEM AND CALIBRATION SUPPORT THEREFOR

(71) Applicant: AUTEL INTELLIGENT TECHNOLOGY CORP., LTD., Guangdong (CN)

(72) Inventors: Lianjun Liu, Guangdong (CN); Biwang Lai, Guangdong (CN); Kaikai Zhang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 17/932,820

(22) Filed: Sep. 16, 2022

(65) Prior Publication Data

US 2023/0013762 A1 Jan. 19, 2023

Related U.S. Application Data

(63) Continuation of application No. PCT/CN2021/081153, filed on Mar. 16, 2021.

(30) Foreign Application Priority Data

Mar. 23, 2020 (CN) .......................... 202010208606.X

(51) Int. Cl.
*F16M 11/18* (2006.01)
*F16M 11/04* (2006.01)
(Continued)

(52) U.S. Cl.
CPC ........... *F16M 11/18* (2013.01); *F16M 11/045* (2013.01); *F16M 11/28* (2013.01);
(Continued)

(58) Field of Classification Search
CPC ...... F16M 11/18; F16M 11/045; F16M 11/28; F16M 11/38; F16M 11/42; G01S 7/40
(Continued)

(56) References Cited

U.S. PATENT DOCUMENTS

| 649,901 | A | * | 5/1900 | Brennan | .............. | A47C 21/024 |
| | | | | | | 5/505.1 |
| 7,044,423 | B2 | * | 5/2006 | Bober | .................... | F16M 11/18 |
| | | | | | | 248/188.4 |

(Continued)

FOREIGN PATENT DOCUMENTS

| CN | 206865642 U | 1/2018 |
| CN | 209521630 U | 10/2019 |

(Continued)

OTHER PUBLICATIONS

International Search Report dated Jun. 7, 2021; PCT/CN2021/081153.

*Primary Examiner* — Christopher Garft

(57) ABSTRACT

Disclosed are a calibration system (600a) and a calibration support (100a) therefor. The calibration support (100a) comprises: a base (10); a vertical frame assembly (20a), comprising a fixed vertical rod (22) and a movable vertical rod (24), wherein the fixed vertical rod (22) is mounted on the base (10), and the movable vertical rod (24) is capable of moving, within a preset range relative to the base (10), in the length direction of the fixed vertical rod (22); and a cross beam (30a), which is detachably mounted to one of a first mounting seat (35a) and a second mounting seat (36a) which are connected to the movable vertical rod (24), the cross beam (30a) being used for mounting a calibration element, and the calibration element being used for calibrating an advanced driver assistant system of a vehicle. The position of the first mounting seat (35a) is higher than the position of the second mounting seat (36a); and when (Continued)

moving relative to the base (10) in the length direction of the fixed vertical rod (22), the movable vertical rod (24) drives the first mounting seat (35*a*) and the second mounting seat (36*a*) to move relative to the base (10) in the length direction of the fixed vertical rod (22).

18 Claims, 20 Drawing Sheets

(51) Int. Cl.
*F16M 11/28* (2006.01)
*F16M 11/38* (2006.01)
*F16M 11/42* (2006.01)
*G01S 7/40* (2006.01)

(52) U.S. Cl.
CPC ............ *F16M 11/38* (2013.01); *F16M 11/42* (2013.01); *G01S 7/40* (2013.01)

(58) Field of Classification Search
USPC ..... 248/124.1, 161, 157, 125.1, 125.8–125.9

See application file for complete search history.

(56) References Cited

U.S. PATENT DOCUMENTS

| | | | |
|---|---|---|---|
| 2004/0217239 A1* | 11/2004 | Chuang | F16M 11/28 248/125.8 |
| 2005/0109892 A1* | 5/2005 | Bober | F16M 11/046 348/E5.128 |
| 2006/0284031 A1* | 12/2006 | Whalen | F16M 13/02 248/157 |
| 2008/0078897 A1* | 4/2008 | Smith | A47B 81/064 248/218.4 |
| 2011/0079688 A1* | 4/2011 | Grove | F16M 11/08 248/176.3 |
| 2021/0270407 A1* | 9/2021 | Shan | G03B 17/561 |

FOREIGN PATENT DOCUMENTS

| | | |
|---|---|---|
| CN | 210036786 U | 2/2020 |
| CN | 111284413 A | 6/2020 |
| CN | 111288261 A | 6/2020 |
| CN | 111336364 A | 6/2020 |
| CN | 111721346 A | 9/2020 |
| CN | 212691245 U | 3/2021 |
| CN | 212691246 U | 3/2021 |
| DE | 102018209709 A1 | 12/2019 |
| WO | WO2019238300 A1 | 12/2019 |
| WO | WO2020114427 A1 | 6/2020 |

* cited by examiner

CALIBRATION SYSTEM AND CALIBRATION SUPPORT THEREFOR

CROSS-REFERENCE

The present application is a continuation of International Patent Application No. PCT/CN2021/081153 filed on Mar. 16, 2021, which claims the priority to the Chinese patent application No. 202010208606.X entitled "Calibration System and Calibration Support Therefor" filed on Mar. 23, 2020, to the China National Intellectual Property Administration, the entire contents of both are incorporated herein by reference.

TECHNICAL FIELD

The present application relates to the technical field of vehicle maintenance and equipment calibration, and in particular to a calibration system and calibration support thereof.

BACKGROUND ART

An advanced driver assistant system, referred to as ADAS, is an active safety technology to use a variety of sensors mounted on a vehicle to collect environmental data inside and outside the vehicle immediately, and perform technical processing such as the identification, detection, and tracking of static and dynamic objects, so as to enable a driver to detect a possible danger at the fastest time, thereby drawing attention and improving the safety. ADAS uses sensors such as cameras, radars, lasers, ultrasonic waves, etc. to detect light, heat, pressure, or other variables used to monitor the condition of the vehicle. The sensors are typically on the front and rear bumpers, side-view mirrors, the inside of a steering column, or a windshield. During the use of the vehicle, vibrations, collisions, ambient temperature and humidity, etc. may change the physical mounting state of the above-mentioned sensors so that an adjustment or a calibration needs to be performed irregularly.

In adjusting or calibrating such sensors, calibration elements are generally mounted on a calibration support to adjust or calibrate the sensors on the vehicle. However, the mounting heights of sensors on different vehicles are different, and the mounting heights of sensors with different functions on the same vehicle are also different. At present, most calibration supports have a relatively small lifting height range, resulting in a relatively high cost of replacing calibration supports when calibrating sensors of different vehicles or with different functions.

SUMMARY OF THE INVENTION

The embodiments of the present application are intended to provide a calibration system and a calibration support thereof, which can solve the technical problem of a small lifting and lowering height range of a calibration support in the prior art.

The embodiments of the present application solve the technical problem thereof by using the following technical solutions.

In the first aspect, there is provided a calibration support, comprising: a base; a vertical frame assembly, comprising a fixed vertical rod and a movable vertical rod, wherein the fixed vertical rod is mounted on the base, and the movable vertical rod is capable of moving, within a preset range relative to the base, in the length direction of the fixed vertical rod; and a cross beam, which is detachably mounted to one of a first mounting seat and a second mounting seat which are connected to the movable vertical rod, the cross beam being used for mounting a calibration element, and the calibration element being used for calibrating an advanced driver assistant system of a vehicle. The position of the first mounting seat is higher than the position of the second mounting seat; and when moving relative to the base in the length direction of the fixed vertical rod, the movable vertical rod drives the first mounting seat and the second mounting seat to move relative to the base in the length direction of the fixed vertical rod.

In comparison with the prior art, in the calibration support of the present embodiment, the movable vertical rod is provided with a first mounting seat and a second mounting seat having different heights, and the cross beam can be mounted to one of the first mounting seat and the second mounting seat, so that the cross beam can be lifted and lowered in different lifting and lowering ranges, thereby expanding the lifting and lowering range of the calibration support.

In the second aspect, there is provided a calibration support, comprising: a base; a vertical frame assembly mounted to the base, the vertical frame assembly being arranged in a vertical direction; wherein the vertical frame assembly comprises a fixed vertical rod and a movable vertical rod, the fixed vertical rod being mounted to the base, and the movable vertical rod being movable in the vertical direction relative to the fixed vertical rod; and a cross beam assembly mounted in at least one of a first position of the movable vertical rod and a second position of the fixed vertical rod, and movable in the vertical direction relative to the vertical frame assembly; the first position being higher than the second position;

wherein the cross beam assembly is used for mounting a calibration element which is for calibrating an advanced driver assistant system of a vehicle.

In comparison with the prior art, in the calibration support of the present embodiment, the cross beam assembly is mounted to at least one of a first position of the movable vertical rod and a second position of the fixed vertical rod, and is capable of moving along the length direction of the fixed vertical rod, wherein the first position is different in height from the second position, and the lifting and lowering range of the cross beam mounted at the first position is different from the lifting and lowering range of the cross beam mounted at the second position, thereby expanding the lifting and lowering range of the calibration support.

In the third aspect, there is provided a calibration support, comprising: a base; a vertical frame assembly mounted to the base, the vertical frame assembly being arranged in a vertical direction; wherein the vertical frame assembly comprises a fixed vertical rod and a movable vertical rod, the fixed vertical rod being mounted to the base, and the movable vertical rod being movable in the vertical direction relative to the fixed vertical rod; a first mounting seat mounted to the movable vertical rod and movable in the vertical direction relative to the base; a second mounting seat mounted to the fixed vertical rod and movable in the vertical direction relative to the base; a position of the first mounting seat being higher than the position of the second mounting seat; and a cross beam detachably mounted to one of the first mounting seat and the second mounting seat for mounting a calibration element, the calibration element being used for calibrating an advanced driver assistant system of a vehicle.

In comparison with the prior art, in the calibration support of the present embodiment, the movable vertical rod is provided with a first mounting seat, the fixed vertical rod is provided with a second mounting seat, the first mounting seat and the second mounting seat are different in height and are both movable in the vertical direction, and the cross beam is mounted to one of the first mounting seat and the second mounting seat, so that the lifting and lowering ranges of the cross beam are different, thereby expanding the lifting and lowering range of the calibration support.

In the fourth aspect, there is provided a calibration system, comprising: the calibration support described above; and a calibration element mounted to the calibration support, the calibration element being used for calibrating an advanced driver assistant system of a vehicle.

BRIEF DESCRIPTION OF THE DRAWINGS

One or more embodiments are illustrated by way of examples with a figure in the corresponding drawings. The illustrative examples are not to be construed as limiting the embodiments. In the drawings, elements having the same reference numeral designations represent like elements, and unless otherwise specified, the drawings are not to scale.

DETAILED DESCRIPTION OF THE INVENTION

Figure 1:
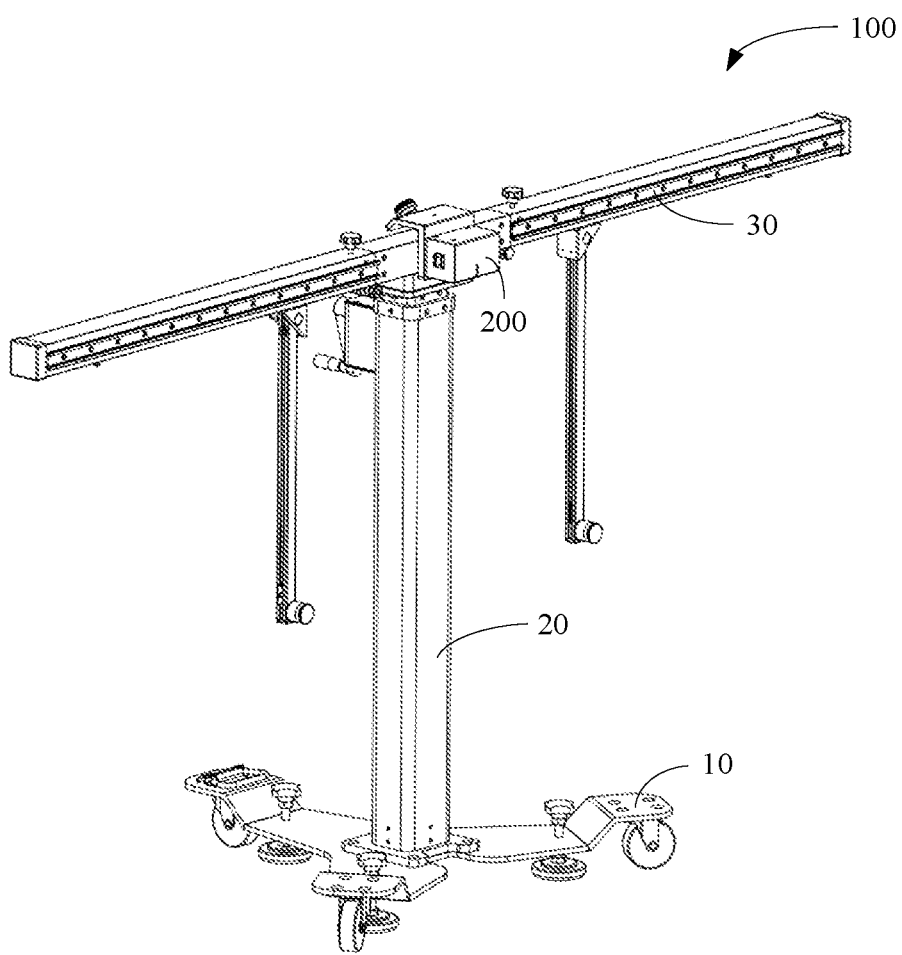
FIG. 1 is a stereogram of a calibration support according to an embodiment of the present application, wherein the calibration support is mounted with a multi-line laser.

In order that the present application may be readily understood, a more particular description of the application will be rendered by reference to specific embodiments and the accompanying drawings. It needs to be noted that when an element is referred to as being "fixed" to another element, it can be directly on another element or one or more intermediate elements may be present between the elements. When one element is referred to as being "connected" to another element, it can be directly connected to the other element or one or more intermediate elements may be present between the elements. As used herein, orientational or positional relationships indicated by the terms "upper", "lower", "inner", "outer", "vertical", "horizontal", and the like are based on the orientational or positional relationships shown in the drawings, and are merely for the convenience in describing and simplifying the present application, and do not indicate or imply that the referenced devices or elements must have a particular orientation, be constructed and operated in a particular orientation, and thus are not to be construed as limiting the present application. Furthermore, the terms "first", "second", and the like are used for descriptive purposes only and are not to be construed as indicating or implying relative importance.

Unless defined otherwise, all technical and scientific terms used in the description have the same meaning as commonly understood by one of ordinary skill in the art to which this application belongs. The terms used in the description of the present application are for the purpose of describing specific embodiments only and are not intended to be limiting of the present application. As used in the description, the term "and/or" includes any and all combinations of one or more of the associated listed items.

Furthermore, the technical features involved in various embodiments of the present application described below can be combined as long as they do not conflict with each other.

Figure 2:
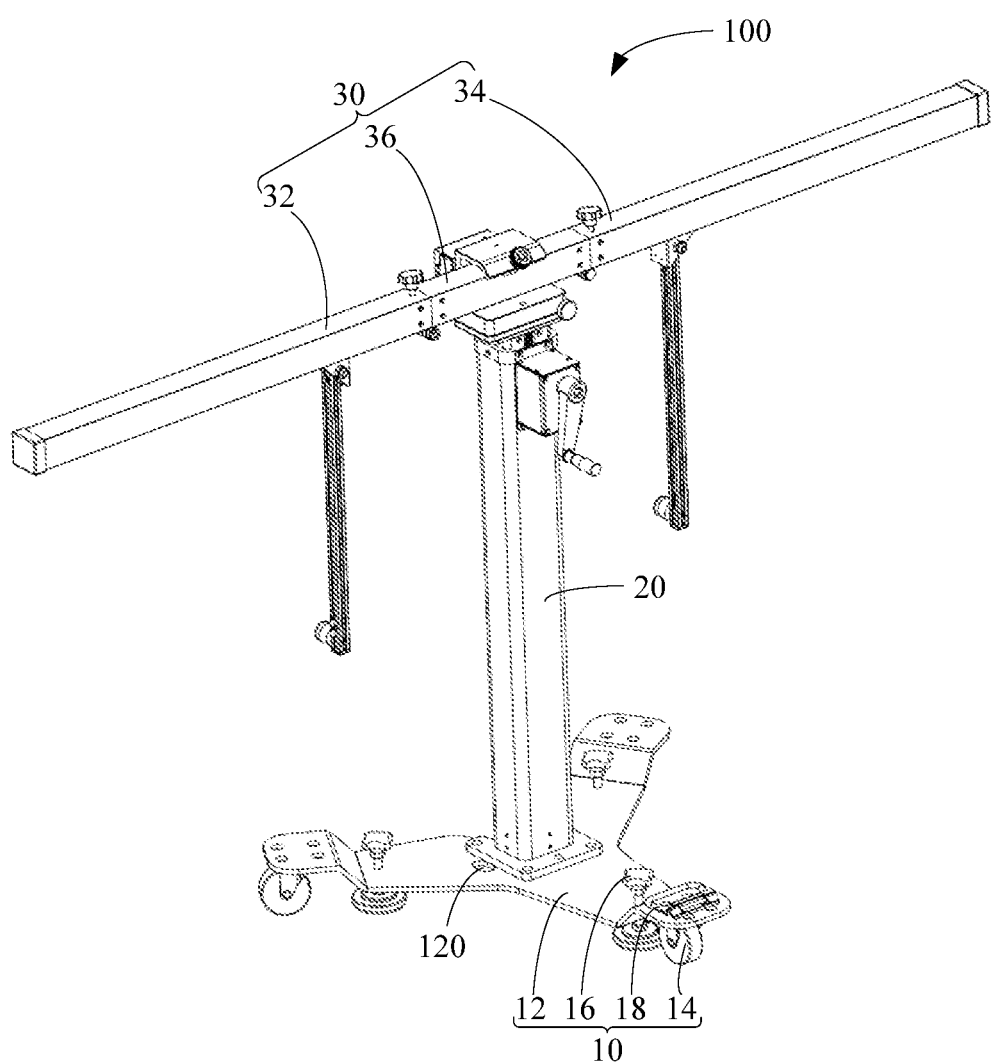
FIG. 2 is a stereogram of another angle of the calibration support shown in FIG. 1.
Figure 3:
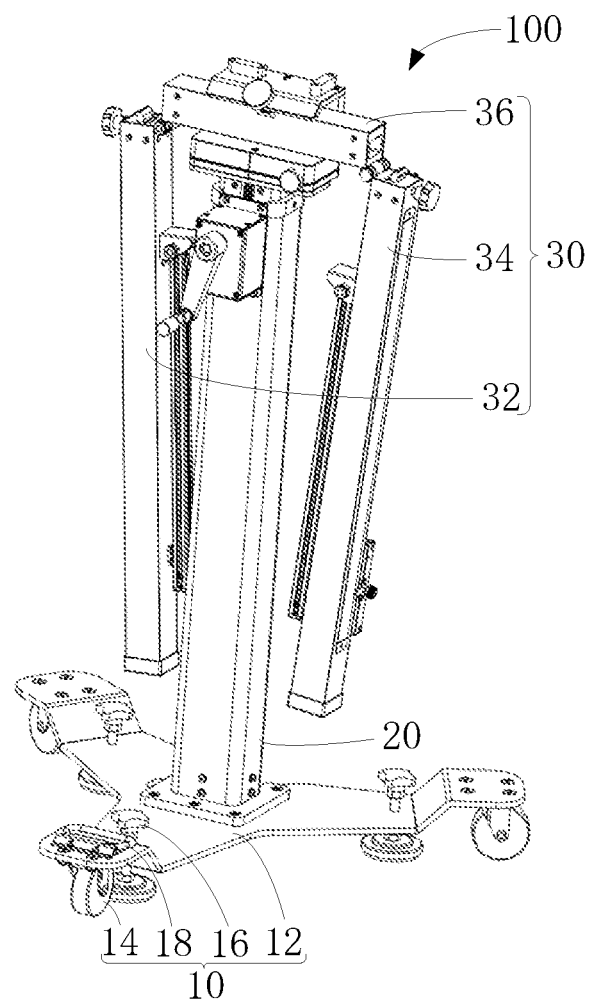
FIG. 3 is a stereogram of the calibration support shown in FIG. 1 with a cross beam assembly of the calibration support in a collapsed state.

Referring to FIGS. 1, 2, and 3 together, one embodiment of the present application provides a calibration support 100, comprising a base 10, a vertical frame assembly 20 fixedly connected to the base 10, and a cross beam assembly 30 comprising a first cross beam 32, a second cross beam 34, and a connecting portion 36, the connecting portion 36 being mounted to the vertical frame assembly 20, one end of the connecting portion 36 being hinged to the first cross beam 32 and the other end of the connecting portion 36 being hinged to the second cross beam 34. The first cross beam 32 and second cross beam 34 are respectively rotatable toward each other relative to the connecting portion 36 to collapse the cross beam assembly 30. The first cross beam 32 and the second cross beam 34 are respectively rotatable away from each other relative to the connecting portion 36 to unfold the cross beam assembly 30.

"Mounting" includes fixed mounting such as welded mounting, and also includes detachable mounting.

The cross beam assembly 30 may be used for mounting a calibration element, such as a multi-line laser 200, a calibration target, a radar reflecting or absorbing device, etc. to calibrate an advanced driver assistant system of a vehicle.

In the calibration support 100 of the present embodiment, the first cross beam 32 and the second cross beam 34 are pivotally rotatable relative to the connecting portion 36, respectively. So that the cross beam assembly 30 is collapsed, thereby reducing the volume of the calibration support 100 to facilitate shipping.

The first cross beam 32, the second cross beam 34, and the connecting portion 36 constitute a cross beam.

Alternatively, the cross beam assembly is mounted on the top surface of the movable vertical rod. This allows the center of gravity of the cross beam assembly to be closer to the center of gravity of the vertical rod compared with the conventional calibration frame so that the stability of the calibration frame can be increased and the use of a base with a smaller area can be used.

Alternatively, the first cross beam 32 and the second cross beam 34 may be rotated toward each other relative to the connecting portion 36. For example, they may be collapsed downward together, or collapsed upward, forward, or backward together. Alternatively, when the first cross beam 32 and the second cross beam 34 are collapsed downward, the length of the connecting portion 36 may be relatively short, and the first cross beam 32 and the second cross beam 34 may be in a drooping state, so that the cross beam assembly 30 may not need to be removed from the vertical frame assembly 20, and the space occupied by the calibration support 100 may be significantly reduced, making it easy for transportation means to carry. When the first cross beam 32 and the second cross beam 34 are collapsed upwards, forwards, and backwards, a device for rotating the cross beams may be provided, so that the final collapsing direction of the first cross beam 32 and the second cross beam 34 is downwards, and the two may also be in a drooping state; alternatively, the length of the connecting portion 36 may be made relatively long, and the collapsed first cross beam 32 and second cross beam 34 may be placed to cling to the connecting portion 36 and secured thereto by a releasable fixing device. In the latter case, in order to further reduce the space occupied by the calibration support 100, the cross beam assembly 30 may be removed from the vertical frame assembly 20, carried to a place to be used, and then mounted on the vertical frame assembly 20.

Those skilled in the art could understand that the manner in which the cross beam assembly 30 is collapsed is not limited to the manner described above. For example, the cross beam may be collapsed into two sections, in which case there is no connecting portion 36; the cross beam may also be folded into four or more sections. However, three sections are preferable. Because this makes the middle section of the cross beam have no fracture so that the cross beam can be stably and evenly fixed to the vertical rod by using only one fastening component in the middle section. In some implementation modes of the present application, the cross beam is an overall structure, i.e. the cross beam is not collapsible or otherwise deformable in shape or form, and is one long and narrow plate-like structure.

In some implementation modes of the present application, the number of cross beams included in the cross beam assembly is not limited, and it may include two or more cross beams simultaneously mounted to the vertical frame assembly, or only one cross beam is mounted to the vertical frame assembly.

The base 10 includes a base body 12, a roller 14, a height adjustment member 16, and a pull ring 18.

The base body 12 has a triangular claw shape, and includes three claws, each of the three claws extending in three different directions. The base body 12 may be made of a metallic material.

The roller 14 is mounted at the bottom surface of the base body 12, and the number of the rollers 14 may be three, and each of the rollers 14 is mounted at the end of one corresponding claw for facilitating the movement of the base body 12. In the present embodiment, the roller 14 is a universal moving roller so that the base body 12 can move back and forth, and left and right randomly.

The height adjustment member 16 is mounted to the base body 12 for adjusting the height of the base body 12. In the present embodiment, the height adjustment member 16 is an adjusting knob, the number of which is three. At least one section of a spiral rod is included below the knob, and the spiral rod cooperates with the thread of the through hole at the base to realize height adjustment. Each height adjustment member 16 is mounted to one corresponding claw and close to one corresponding roller 14. Three height adjustment members 16 are a regular triangular distribution.

The pull ring 18 may be mounted to an upper surface of one of the claws for facilitating the pulling of the calibration support 100.

It will be understood that in some other embodiments, the shape of the base body 12 may vary according to actual needs and is not limited to a triangular claw shape. For example, the base body 12 may be rectangular or circular. The number of the rollers 14 and the height adjustment members 16 may be respectively increased or decreased according to actual requirements. For example, in the case of the base body 12 of a triangular claw shape, the height adjustment members can be two, and one stand bar with a fixed height is coordinated to adjust the angle of the base body 12.

Figure 4:
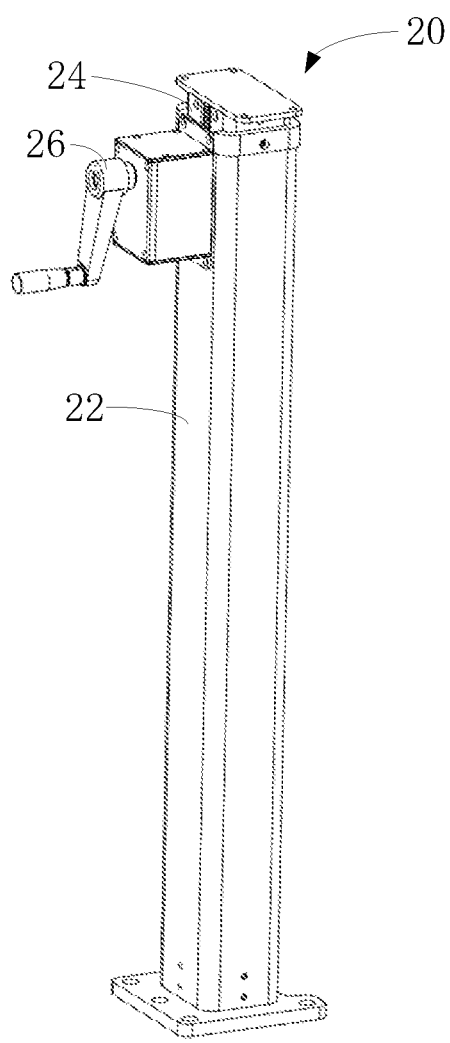
FIG. 4 is a stereogram of a vertical frame assembly of the calibration support shown in FIG. 1.
Figure 5:
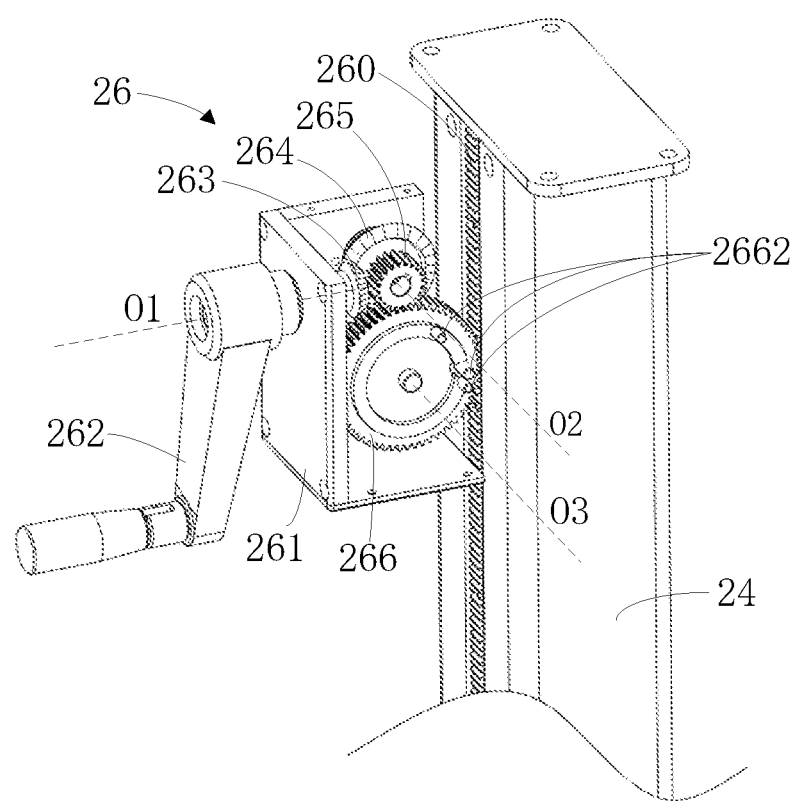
FIG. 5 is a stereogram of the vertical frame assembly shown in FIG. 4 with some elements omitted.

Referring to FIGS. 4 and 5 together, the vertical frame assembly 20 may include a fixed vertical rod 22, a movable vertical rod 24 sleeved within the fixed vertical rod 22, and a driving mechanism 26. The movable vertical rod 24 can move relative to the fixed vertical rod 22 along the length direction of the fixed vertical rod 22, and the driving mechanism 26 is mounted to the fixed vertical rod 22 for driving the movable vertical rod 24 to move relative to the fixed vertical rod 22 along the length direction of the fixed vertical rod 22. By sleeving and connecting the movable vertical rod 24 and the fixed vertical rod 22, the height of the vertical frame assembly 20 can be reduced to nearly half of the original height, and in cooperation with the collapsing of the cross rod assembly 30, the vertical frame assembly 20 can be very suitable for being carried in the rear box of transportation means such as an automobile.

It will be understood that a fixed vertical rod may serve as an inner rod and a movable vertical rod may serve as an outer rod as required. A driving mechanism 26 is mounted to the fixed vertical rod 22 for driving the movable vertical rod 24 to move relative to the fixed vertical rod 22 along the length direction of the fixed vertical rod 22.

Alternatively, the fixed vertical rod 22 and the movable vertical rod 24 are respectively square tubes, and the movable vertical rod 24 is closely sleeved in the fixed vertical rod 22 so that the movable vertical rod 24 can only move relative to the fixed vertical rod 22 along the length direction of the fixed vertical rod 22, and the movable vertical rod 24 can be prevented from moving relative to the fixed vertical rod 22 in other directions. This configuration is very important to achieve a collapsible calibration support 100. Since it is often necessary to utilize a fixed relative positional relationship between the components of the calibration support 100 during the calibration, for example, it is possible to fix one laser on the outer surface of the fixed vertical rod 22. The laser is used to locate the vehicle central axis, thereby determining the relative position between the target carried on the cross beam assembly 30, and the vehicle. Therefore, if there is a slight change in the relative position between the components, the calibration accuracy is affected, or an additional fine tuning mechanism needs to be added to compensate. If the relative position between the components varies considerably, it may also lead to the failure of additional fine tuning mechanisms. Therefore, relative movements, such as relative rotation, between the movable vertical rod 24 and the fixed vertical rod 22 other than in the length direction are to be excluded in the telescoping manner. A convenient way is that the movable vertical rod 24 and the fixed vertical rod 22 are square tubes so as to ensure that only relative movement in the length direction takes place between them.

It will be understood that in some other embodiments, the fixed vertical rod 22 and the movable vertical rod 24 may be tubing of other shapes, for example, cross-sections thereof being polygonal tubing that cooperate with each other, such that the movable vertical rod 24 can only move relative to the fixed vertical rod 22 along the length direction of the fixed vertical rod 22, and such that the movable vertical rod 24 is prevented from moving relative to the fixed vertical rod 22 in other directions. Here, the "cooperation with each other" does not necessarily require that the cross-sections of the fixed vertical rod 22 and the movable vertical rod 24 must be the same, for example, the case that the cross section of the fixed vertical rod 22 provided on the outside may be a hexagon, and the cross section of the movable vertical rod 24 provided on the inside may be a quadrilateral joining the hexagon. And the effect that the movable vertical rod 24 can move only along the length direction of the fixed vertical rod 22 relative to the fixed vertical rod 22 can also be achieved. The cross-sections of the fixed vertical rod 22 and the movable vertical rod 24 may also be cylindrical tubing of elliptical shape cooperating with each other, and the elliptical cross-section may also restrict the relative rotation between the two to some extent.

The fixed vertical rod 22 and the movable vertical rod 24 may each be cylindrical tubing having a circular cross section. At the time, the fixed vertical rod 22 may be prevented from rotating relative to the movable vertical rod 24 by a guide mechanism for guiding the movable vertical rod 24 to move stably relative to the fixed vertical rod 22, or a mechanism for detecting and adjusting the movement of the fixed vertical rod 22 relative to the movable vertical rod 24 other than along the length direction may be added to other components of the calibration support 100. A simple and convenient guiding mechanism is a guide rail and a sliding block device cooperating therewith. A guide rail can be provided on one of the fixed vertical rod 22 and the movable vertical rod 24 at the surface where the two are in contact with each other. A sliding block device such as a lug, a plastic adhesive tape, a roller, a ball, a gear, etc. can be provided on the other of the two. At the time, the sliding block device will be constrained to move on the guide rail and only relative movement along the length direction occurs between the two vertical rods can also be ensured. The guide rail can be a groove, a linear projection, a rack, etc. additionally provided on the tube wall of the vertical rod, or can be a groove, a linear projection, a groove formed between two linear projections, etc. formed on the tube wall itself of the vertical rod. Namely, the vertical rod uses a special-shaped tube wall, and the tube wall itself has a groove, a linear projection, etc. which can serve as a part used by the guide rail. Likewise, the sliding block device may be an additional component additionally provided on the tube wall of the vertical rod, or may be a projection structure formed by means of the tube wall itself of the vertical rod, without the need for an additional component at the tube wall of the vertical rod. In addition, a rack and other mechanisms that realize transmission through meshing, also have a guiding function per se, and this description also includes it in the scope of a guide rail. The guiding effect can also be achieved by a gear and rack transmission mechanism as described in the following embodiments. Alternatively, a rack may be provided in a groove guide rail.

It will be understood that the arranged positions of the guide rail and the sliding block device can be interchanged, either the guide rail being arranged on the movable vertical rod and the sliding block device being arranged on the fixed vertical rod, or the case that the positions can be interchanged.

It will be understood that the guide mechanism is not limited to a fixed vertical rod 22 and a movable vertical rod 24 having circular cross-sections, and a guide mechanism can also be used on the fixed vertical rod 22 and movable vertical rod 24 of other cross-sectional shapes to enhance the guiding effect and obtain a more stable relative motion or a relative motion with less friction force. For non-circular cross-sectional shapes, it is also possible to obtain a more stable relative motion or a relative motion with less friction force by only using a linear motion device without a guide rail, in which case the non-circular outer vertical rod itself plays the role of guiding.

Embodiments of the present application do not limit the implementation mode of the driving mechanism 26. In some embodiments, the driving mechanism 26 may be a gear box. The driving mechanism 26 may also be other driving mechanisms, such as a lead screw, a synchronous belt, etc. so long as the movable vertical rod 24 can be driven to move relative to the fixed vertical rod 22.

In some embodiments, the movable vertical rod 24 is provided with a limiting member 242, the limiting member 242 is located in the fixed vertical rod 22, the inner wall of the fixed vertical rod 22 is provided with a flange, and the flange is close to the top end of the fixed vertical rod 22. When the movable vertical rod 24 moves relative to the fixed vertical rod 22 until the limiting member 242 abuts against the flange, the movable vertical rod 24 stops moving so that the movable vertical rod 24 can be prevented from separating from the fixed vertical rod 22. Therefore, the movable vertical rod can be ensured to move within a preset range relative to the fixed vertical rod or the base. The definition of the preset range can be achieved by defining the position of the limiting member 242 of the movable vertical rod 24 or the flange of the fixed vertical rod 22. In this embodiment, the limiting member 242 is a collar that fits over the outer wall of the movable vertical rod 24.

Figure 6:
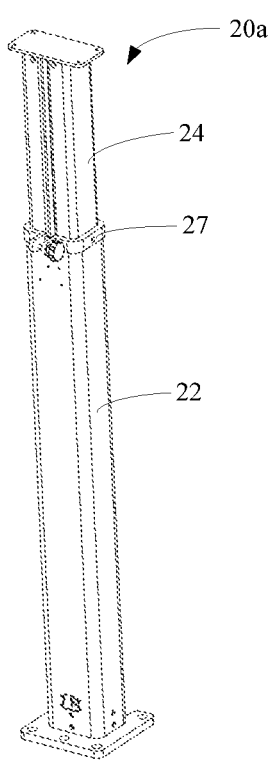
FIG. 6 is a stereogram of a vertical frame assembly according to some other embodiments.
Figure 7:
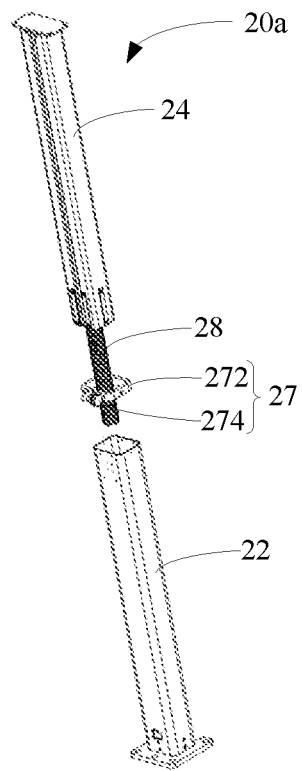
FIG. 7 is an exploded view of the vertical frame assembly shown in FIG. 6.

Referring to FIGS. 6 and 7 together, in some embodiments, the driving mechanism 26 is omitted and the vertical frame assembly 20 further includes a fastening mechanism 27 and an elastic body 28.

The fastening mechanism 27 may be mounted at one end of the fixed vertical rod 22 for fixing the movable vertical rod 24 to the fixed vertical rod 22. The fastening mechanism 27 comprises a fastening ring 272 and a bolt 274. The fastening ring 272 is sleeved on the fixed vertical rod 22, the fastening ring 272 may be a bent metal strip, and the bolt 274 is mounted to two ends of the fastening ring 272.

The elastic body 28 is located inside the fixed vertical rod 22 and the movable vertical rod 24, the elastic body 28 being compressed between the bottom of the fixed vertical rod 22 and the movable vertical rod 24. The elastic body 28 may, as required, be connected with the movable vertical rod 24 in a position at the bottom, top, or middle of the movable vertical rod 24. The elastic body is in a compression state when the movable vertical rod moves closest to the bottom of the fixed vertical rod. In the present embodiment, the elastic body 28 is a compressed spring. It will be understood that in some other embodiments, the elastic body 28 may be other elastic elements, such as an elastic sheet, a pressure bar, a hydraulic rod, etc.

When it is required to raise the movable vertical rod 24 relative to the fixed vertical rod 22, the bolt 274 is rotated so that the fastening ring 272 releases the fixed vertical rod 22. An upward force is applied to the movable vertical rod 24 so that the movable vertical rod 24 can be raised along the length direction of the fixed vertical rod 22. An external force applied to the movable vertical rod 24, for example, an external force applied by an operator, can be reduced by the elastic force of the elastic body 28. When the desired position is reached, the bolt 274 is rotated to fasten the fixed vertical rod 22 so that the movable vertical rod 24 is fixed in the desired position. When it is required to lower the movable vertical rod 24 relative to the fixed vertical rod 22, the bolt 274 is rotated so that the fastening ring 272 releases the fixed vertical rod 22, and the movable vertical rod 24 can be lowered along the length direction of the fixed vertical rod 22 under the gravity of the movable vertical rod 24 and the cross beam assembly 30. The lowering speed of the movable vertical rod 24 can be reduced by means of the elastic force of the elastic body 28 so that the movable vertical rod 24 can be prevented from being lowered too quickly and colliding with the fixed vertical rod 22 which causes damage.

It will be understood that in some other embodiments, the fastening mechanism 27 may be of other structures so long as it is capable of fixing the movable vertical rod 24 in a desired position. For example, the fastening mechanism 27 may be a screw that passes through and threadingly fits the fixed vertical rod 22. When the movable vertical rod 24 is moved to a desired position relative to the fixed vertical rod 22, the screw is rotated to abut against the movable vertical rod 24 so that the movable vertical rod 24 is fixed in the desired position. The screw is rotated to separate from the movable vertical rod 24 such that the movable vertical rod 24 can move relative to the fixed vertical rod 22 along the length direction of the fixed vertical rod 22.

Figure 8:
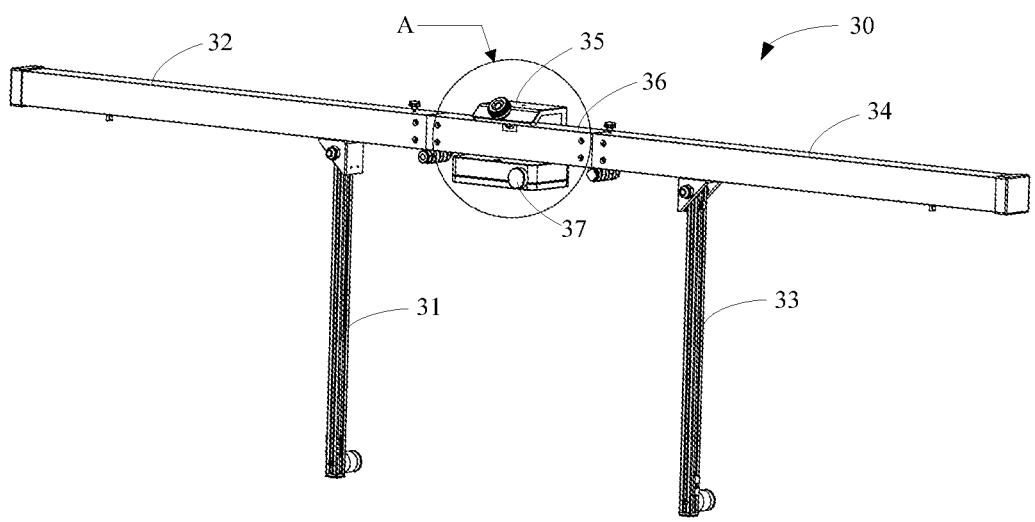
FIG. 8 is a stereogram of a cross beam assembly of the calibration support shown in FIG. 1.
Figure 9:
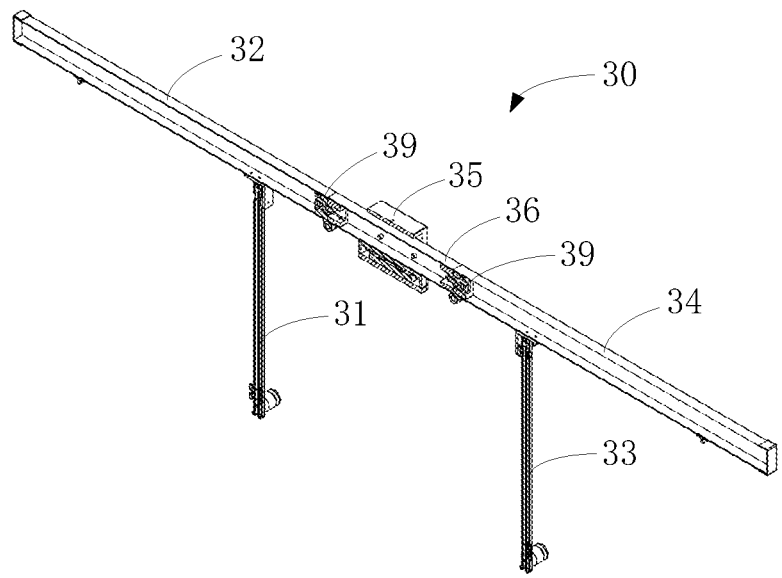
FIG. 9 is a sectional view of the cross beam assembly shown in FIG. 8.
Figure 10:
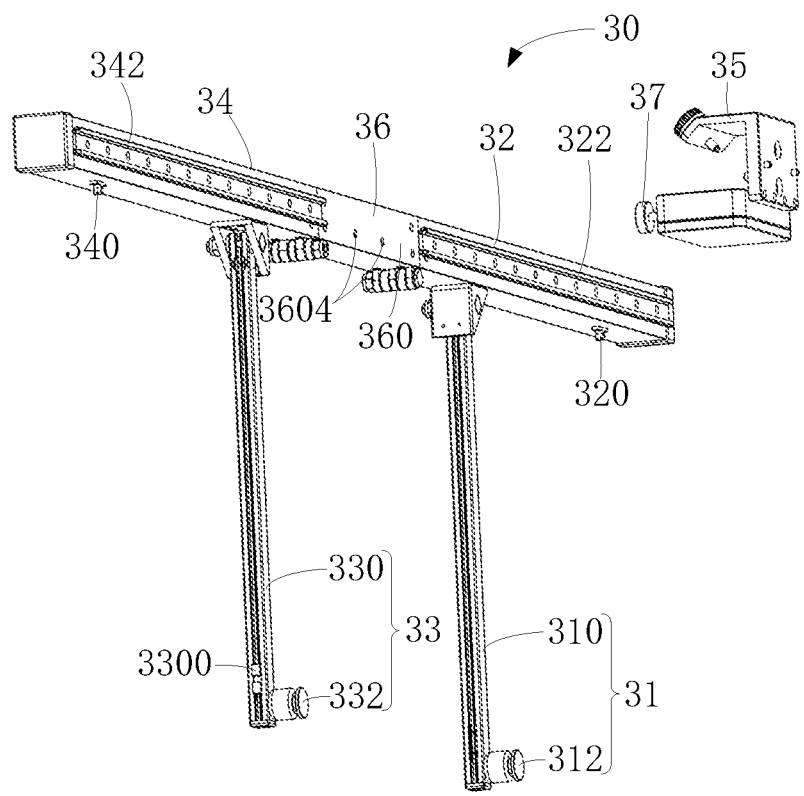
FIG. 10 is an exploded view of the cross beam assembly shown in FIG. 8.

Referring to FIGS. 8, 9, and 10, the cross beam assembly 30 includes a first support rod 31, a first cross beam 32, a second support rod 33, a second cross beam 34, a mounting seat 35, a connecting portion 36 36, an adjustment mechanism 37, and an articulation mechanism 39. The first support rod 31 and the second support rod 33 function to support the target against falling, especially when the target has a large area and a heavy weight. One end of the first support rod 31 may be pivotally connected to the first cross beam 32 by a hinge mechanism, a bisagra mechanism, etc. The first support rod 31 may rotate relative to the first cross beam 32 so as to be unfolded to be perpendicular to the first cross beam 32, and may be engaged with and parallel to the first cross beam 32.

In some embodiments, the first cross beam 32, the second cross beam 34, and the connecting portion 36 may be integrally formed as a cross beam, i.e. the cross beam is a non-collapsible or non-deformable long and narrow plate-like structure.

The first support rod 31 includes a first support rod body 310 and a first support member 312. One end of the first support rod body 310 is hinged to the first cross beam 32, and the other end of the first support rod body 310 is mounted to the first support member 312. The side wall of the first support rod body 310 is provided with a first locking groove (not shown).

Similarly, one end of the second support rod 33 may be hinged to the second cross beam 34 by a hinge mechanism, a bisagra mechanism, etc. The second support rod 33 may rotate relative to the second cross beam 34 to be unfolded to be perpendicular to the second cross beam 34, or may be engaged with and parallel to the second cross beam 34. The second support rod 33 includes a second support rod body 330 and a second support member 332. One end of the second support rod body 330 is hinged to the second cross beam 34, and the other end of the second support rod body 330 is mounted to the second support member 332. The side wall of the second support rod body 330 is provided with a second locking groove 3300. The first support member 312 and the second support member 332 extend in the same direction. When the first support rod 31 is unfolded to be perpendicular to the first cross beam 32 and the second support rod 33 is unfolded to be perpendicular to the second cross beam 34, the first locking groove 3300 and the second locking groove 3300 are arranged away from each other, and the first support member 312 and the second bracket member 332 can be used to jointly support a calibration element, such as a pattern plate.

The first cross beam 32 is provided with a first locking block 320 and a first guide rail 322. The first locking block 320 and the first support rod 31 are both connected to the same side of the first cross beam 32. When the first support rod 31 rotates to be parallel to the first cross beam 32, the first locking block 320 is locked into a first locking groove, and the first support rod 31 is locked to the first cross beam 32. The first guide rail 322 is arranged on the other side of the first cross beam 32, the first guide rail 322 is arranged in parallel with the first cross beam 32, the first guide rail 322 is used for mounting a pendant for mounting a calibration element, such as a calibration target, a reflector, a laser, etc. and the pendant can slide along the first guide rail 322.

Similarly, the second cross beam 34 is provided with a second locking block 340 and a second guide rail 342. The second locking block 340 and the second support rod 33 are both connected to the same side of the second cross beam 34. When the second support rod 33 rotates to be parallel to the second cross beam 34, the second locking block 340 is locked into the second locking groove 3300 so that the second support rod 33 is locked to the second cross beam 34. The second guide rail 342 is arranged on the other side of the second cross beam 34, the second guide rail 342 is arranged in parallel with the second cross beam 34, the second guide rail 342 is used for mounting a pendant for mounting a calibration element, such as a reflector, and the pendant can slide along the second guide rail 342. The first guide rail 322 and the second guide rail 342 are symmetrically arranged relative to the connecting portion 36, and the first cross beam 32 and the second cross beam 34 are also symmetrically arranged relative to the connecting portion 36. When the base 10 is placed in a horizontal plane, the first guide rail 322, the second guide rail 342, the first cross beam 32, and the second cross beam 34 are all horizontally arranged.

It will be understood that in some other embodiments, the positions of the first locking block 320 and the first locking groove may be interchanged, namely, the first locking block 320 is mounted to the first support rod body 310, and the first locking groove is provided on the first cross beam 32; similarly, the positions of the second locking block 340 and the second locking groove 3300 may also be interchanged, that is, the second locking block 340 is mounted to the second support rod body 330, and the second locking groove 3300 is provided on the second cross beam 34. Alternatively, the first locking groove and the second locking groove 3300 are recessed in the corresponding cross beams.

It will be understood that in some other embodiments, the first guide rail 322 and the second guide rail 342 may be provided on other faces of the cross beam, such as a top surface. In some other embodiments, the first guide rail 322 and the second guide rail 342 need not be provided, and the calibration element may be hung directly on the cross beam by using a hook, etc. The first guide rail 322 and the second guide rail 342 may also have other configurations, not necessarily as shown. For example, they may be one or several groove lines provided on the top surface of the cross beam, and the outer wall of the cross beam itself may be used to form the groove line without mounting an additional guide rail.

It will be understood that the number of support rods is not limited by the embodiments described above. For example, the support rod may have only one and be provided at an approximately central position of the connecting portion 36 so that at the time, it may also well support a target approximately in the middle of the cross beam assembly 30. When the target for calibration is located at another position, the support rod may also be provided at a corresponding position to perform the supporting. The position of the support rod may also be more than two. In addition, the support rod may also be provided on a track which is provided on the side face or bottom face of the cross beam assembly 30 so that the support rod may be moved along the assembled cross beam assembly 30 to support targets that may be in different positions at an appropriate position. It will be understood that when a guide rail is used to make the support rod move, the support rod can also be locked on the cross beam assembly 30 by means of a locking block or a locking groove.

The connecting portion 36 of the cross beam is sleeved in the mounting seat 35, the first surface 360 of the connecting portion 36 is concavely provided with a locating hole 3604, the number of locating holes 3604 is preferably two, and two of the locating holes 3604 are provided along the length direction of the connecting portion 36.

Figure 11:
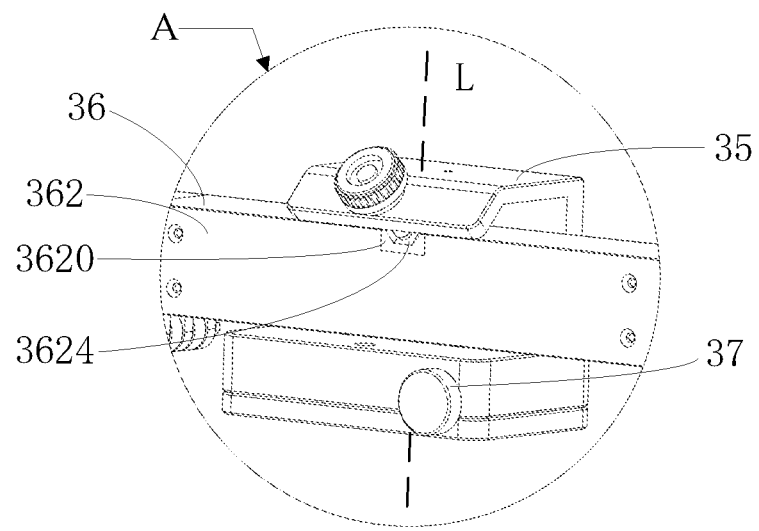
FIG. 11 is a partially enlarged view of portion A of FIG. 8.
Figure 12:
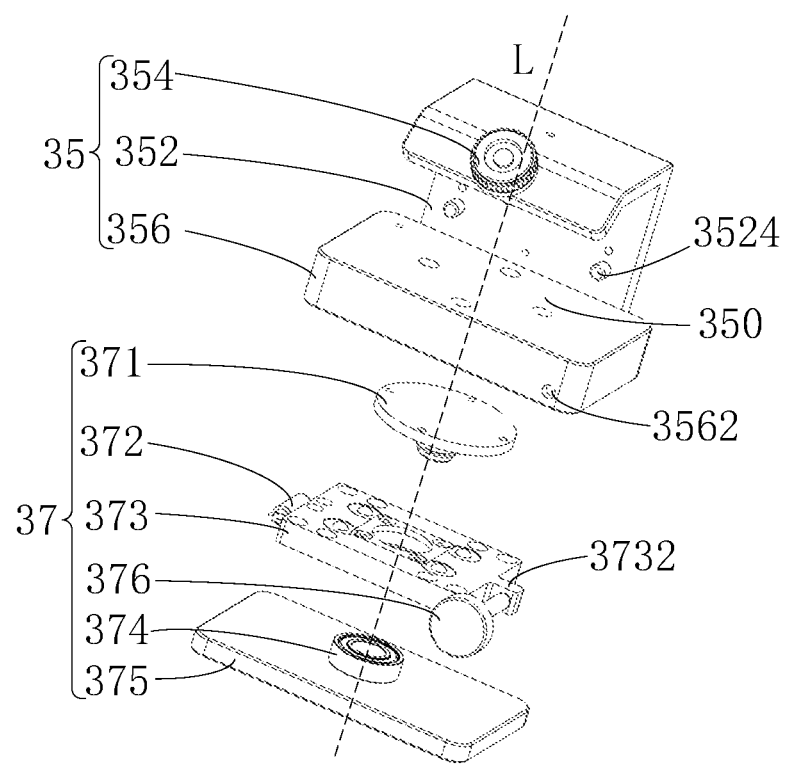
FIG. 12 is an exploded view of an adjustment mechanism of the cross beam assembly shown in FIG. 8.

Referring to FIG. 11, the connecting portion 36 is provided with a fixed groove 3620 in which a fixed surface 3624 is provided, and the fixed groove 3620 cooperates with a fixed rod 354 in FIG. 12 to fix the cross beam assembly to the mounting seat 35. Alternatively, the fixed groove 3620 is provided such that the fixed surface 3624 is at an angle to the bottom surface of the mounting seat 35. The advantages of this arrangement are illustrated in conjunction with the fixed rod of FIG. 12. For example, the fixed groove 3620 may be provided between the second surface 362 of the cross beam and the top surface, wherein the second surface 362 is provided parallel to the first surface 360, and the fixed surface 3624 is provided at an angle to the first surface 360 and the second surface 362, such as 45 degrees to the first surface 360 and the second surface 362.

In this embodiment, the first cross beam 32, the second cross beam 34, and the connecting portion 36 are all square tubes so that the weight of the calibration support 100 can be reduced, and the connecting portion 36 can be easily and securely sleeved in the adjustment mechanism 38. It will be understood that in some other embodiments, the first cross beam 32, the second cross beam 34, and the connecting portion 36 may be tubing, special-shaped materials, or rods, etc. of other shapes, for example, tubing or rods that are polygonal or circular. When the cross beam is tubing of other shapes, the fixed groove 3620 may be positioned such that the fixed surface 3624 is at an angle to the bottom surface of the mounting seat 35.

Figure 13:
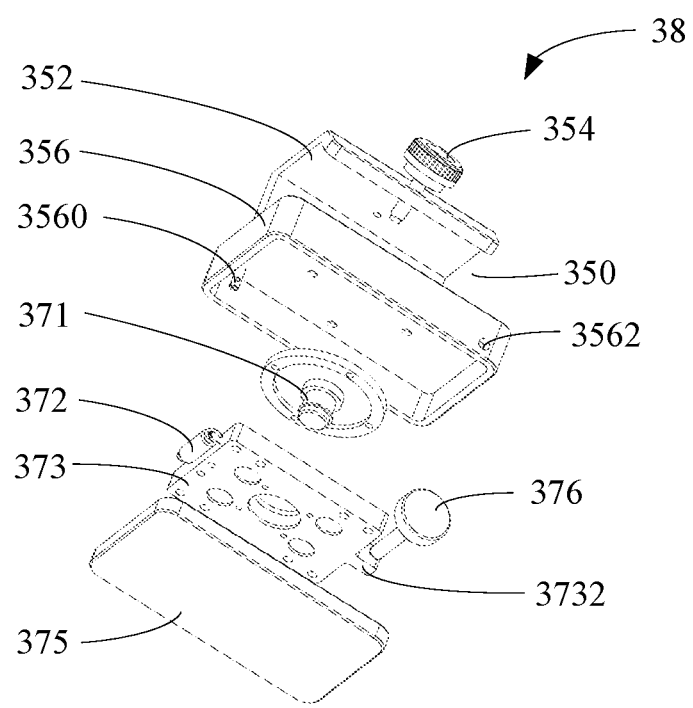
FIG. 13 is an exploded view of another angle of the adjustment mechanism shown in FIG. 12.

With reference to FIGS. 12 and 13, the mounting seat 35 can be used as a first mounting seat in the embodiment of the present application and be mounted to the movable vertical rod; any of the above-mentioned cross beams can be mounted to the first mounting seat; the cross beam can be fixedly or detachably mounted to the first mounting seat; the cross beam can be detachably mounted to the first mounting seat so as to facilitate the disassembly and mounting of the calibration support and the improvement of the convenience of transportation or movement of the calibration support. The position where the first mounting seat is mounted to the movable vertical rod is a first position of the movable vertical rod. For example, the case that the first mounting seat can be mounted to the top of the movable vertical rod, namely, one end of the movable vertical rod away from the base so that when the movable vertical rod moves in the vertical direction relative to the fixed vertical rod or the base, the first mounting seat can be driven to move in the vertical direction relative to the fixed vertical rod or the base; when the cross beam is mounted to the first mounting seat, the cross beam can move in the vertical direction along the vertical rod support; the range where the cross rod can move is the range where the movable vertical rod moves relative to the fixed vertical rod. In an embodiment of the present application, the mounting seat 35 is sleeved on the cross beam, such as sleeving on the connecting portion 36. The mounting seat 35 comprises a holding member 352, a fixed rod 354, and a mounting shell 356.

Alternatively, the mounting seat 35 may be provided on the adjustment mechanism 37 such that the mounting seat 35 may rotate relative to the vertical frame assembly 20 about an adjustment rotation axis L under the adjustment of the adjustment mechanism 37 so as to adjust the horizontal angles of the mounting seat 35 and the cross beam assembly 30. Preferably, the adjustment mechanism 37 is provided in an up and down relationship with the mounting seat to facilitate easy removal and mounting of the cross beam from above while achieving horizontal angular adjustment. The adjustment rotation axis L is arranged in parallel with the fixed vertical rod 22 and the movable vertical rod 24, that is, when the calibration support 100 is placed on a horizontal plane, the adjustment rotation axis L is arranged vertically. The mounting seat 35 is provided with a notch 350 for facilitating placing the connecting portion 36 into the mounting seat 35 or removing the connecting portion 36 from the mounting seat 35.

The holding member 352 is generally hook-shaped to facilitate fixing the connecting portion 36. One end of the holding member 352 is fixedly connected to a mounting shell 356, such as being mounted on an upper surface or side face of the mounting shell 356, and the other end surrounds and holds the connecting portion 36 36 of the cross beam assembly 20, leaving a notch 350. For example, the holding member 352 may have the shape shown in FIG. 12, but may have other shapes, such as a circular hook shape, a hook shape having other polygonal shapes, or a hook shape having a combination of a circular ring and a polygonal shape, as long as a stable grip on the connecting portion 36 can be achieved. As used herein, "generally hook-shaped" means that the holding member 352 can extend a length from an angle to support and hold the connecting portion 36.

The holding member 352 and the mounting shell 356 enclose to form a mounting channel for receiving the connecting portion 36. The mounting channel communicates with the notch 350. A locating post 3524 is provided on an inner surface of the holding member 352, and two of the locating posts 3524 are located in the mounting channel for inserting two of the locating holes 3604 (see FIG. 7) to facilitate positioning the connecting portion 36 in the mounting channel. The function of the locating hole is to further reduce any displacement of the cross beam assembly 20 in the horizontal direction relative to the mounting seat 35 during calibration. The locating post 3524 may also be provided on the upper surface of the mounting shell 356 or on both the upper surface of the mounting shell 356 and the inner surface of the holding member 352. Here, the "locating post" includes a circular, square, elongated locating post, and the "locating hole" includes a circular, square, elongated locating hole. When the locating post and locating hole are generally point-shaped, at least two locating posts 3524 are preferably provided along the length direction of the connecting portion 36 to ensure that the connecting portion 36 is not displaced along the length direction. When the locating post and locating hole are generally elongated, only one pair of locating post and locating hole may be used. It will be understood that in some other embodiments, the positions of the locating hole 3604 and the locating post 3524 may be interchanged, i.e. the locating hole 3604 is opened in the holding member 352 and communicates with the mounting channel, and the locating post 3524 is provided on the first surface 360 (see FIG. 7).

Alternatively, the fixed rod 354 is provided on the holding member 352. The fixed rod 354 comprises a knob and at least one section of a screw rod, and cooperates with the thread of the holding member 352. When the connecting portion 36 is sleeved on the mounting seat 35, the central axis of the fixed rod 354 is perpendicular to the fixed surface 3624 at the cross beam connecting portion 36; the fixed rod 354 is rotated so that the fixed rod 354 abuts tightly against the fixed surface 3624 so that the connecting portion 36 of the cross beam assembly is fixed to the mounting seat 35, or the fixed rod 354 is rotated such that the fixed lever 354 may be separated from the fixed surface 3624 and the connecting portion 36 may be removed from the mounting seat 35 through the notch 350.

Alternatively, the fixed surface 3624 is at an angle to the bottom surface (i.e. horizontal plane) of the mounting seat 35, and the fixed rod 354 is at an angle greater than 0 degrees and less than 90 degrees to the bottom surface of the mounting seat 35. Alternatively, the angle is generally 45 degrees. With this arrangement, it is possible to apply a compressing force to the connecting portion 36 towards the bottom surface and a side face of the mounting seat, the side face being the side face opposite to the extension direction of the fixed rod 354 itself, so as to realize the highly stable fixation of the connecting portion 36 by the fixed seat so that the cross beam assembly can be easily disassembled and assembled.

It will be understood that the mounting seat 35 may have other configurations, such as not necessarily having one notch, and the notch may be blocked by using a baffle and the like after the connecting portion 36 is placed into the mounting seat 35. It is also possible to mount the connecting portion 36 in other ways. For example, the case that the mounting 35 can be one complete ring-shaped structure without a notch for placing the cross beam. At the time, the cross beam can be assembled first and then inserted into the mounting seat 35, and the cross beam is screwed and fixed with the fixed rod 354.

It will be understood that the bottom face or side face of the mounting seat 35 against which the connecting portion 36 is pressed may be a circular arc or other irregular shapes. At this time, the fixed rod 354 can also be used to compress the connecting portion 36 on these faces. At this time, the fixed rod and these faces may be in line contact rather than surface contact, but the compressing effect will not be affected.

Alternatively, when the mounting seat 35 includes a notch 350, the surface of the mounting seat 35 facing away from the notch 350 may also be used for mounting a calibration element, such as a multi-line laser 200 (see FIG. 1), etc.

The mounting shell 356 is generally cuboid with an opening on one side. The adjustment mechanism 37 is provided within an opening of the mounting shell 356. The mounting shell 356 is provided with a threaded hole 3562. The adjustment mechanism 37 includes a supporting shaft 371, a first elastic member 372, a rotational member 373, a bearing seat 374, a pedestal 375, and an adjustment lever 376. The adjustment mechanism 37 is used to adjust the angle of the cross beam assembly 20 in the horizontal direction (i.e. the yaw angle).

The supporting shaft 371 is accommodated in the mounting shell 356, and is fixedly mounted to an inner wall of the mounting shell 356. The central axis of the supporting shaft 371 coincides with the adjustment rotation axis L.

One end of the first elastic member 372 is fixed to the mounting post 3560, and the other end of the first elastic member 372 is fixed to the rotational member 373. In this embodiment, the first elastic member 372 is a contact spring.

The rotational member 373 is generally cubic, one end thereof being provided with a projection 3732. The projection 3732 and the first elastic member 372 are located on two opposite sides of the rotational member 373, respectively. The rotational member 373 is sleeved on the bearing seat 374.

The bearing seat 374 is fixedly mounted to a surface of the pedestal 375 with the central axis of the bearing seat 374 coincident with the adjustment rotation axis L. The rotational member 373 is fixedly mounted to the pedestal 375 and sleeved on the bearing seat 374. One end of the supporting shaft 371 is inserted into the bearing seat 374 so that the supporting shaft 371 and the mounting shell 356 can rotate together about the adjustment rotation axis L relative to the rotational member 373, the bearing seat 374, and the pedestal 375.

The pedestal 375 is used to be mounted to the movable vertical rod 24, and the movable vertical rod 24 can drive the pedestal 375 up or down. In this embodiment, the pedestal 375 is cubic that covers the opening of the mounting shell 356. The supporting shaft 371, the first elastic member 372, and the rotational member 373 are all housed in a cavity enclosed by the mounting shell 356 and the pedestal 375.

The term "cubic" as used herein includes the case of a sheet.

The adjustment lever 376 is mounted in the threaded hole 3562, and the adjustment lever 376 is rotated such that the adjustment lever 376 abuts tightly against the projection 3732. The mounting seat 35 is pushed to rotate about the adjustment rotation axis L relative to the rotational member 373 and the pedestal 375, thereby adjusting the horizontal angles of the mounting seat 35 and the connecting portion 36 such that the first elastic member 372 is stretched. Rotating the adjustment lever 376 in the opposite rotational direction, the mounting seat 35 is rotationally reset relative to the rotational member 373 and pedestal 375 by being pulled by the first elastic member 372 about the adjustment rotation axis L.

It will be understood that in some other embodiments, the pedestal 375 may be omitted and the rotational member 373 and bearing seat 374 may be directly fixedly mounted to the top surface of the movable vertical rod 24.

It will be understood that the adjustment mechanism 37 described above may be alternatively used. When the adjustment mechanism 37 is removed, the mounting shell 356 of the mounting seat 35 may be removed and the holding member 352 is mounted at the top surface of the movable vertical rod 24 or other extra additional mounting face. It should be understood that the holding member 352 may also extend to form a bottom surface and surround the lower surface of the connecting portion 36 of the cross beam assembly 30, i.e. the holding member 352 may have a bottom surface that is mounted on the mounting shell 356.

Figure 14:
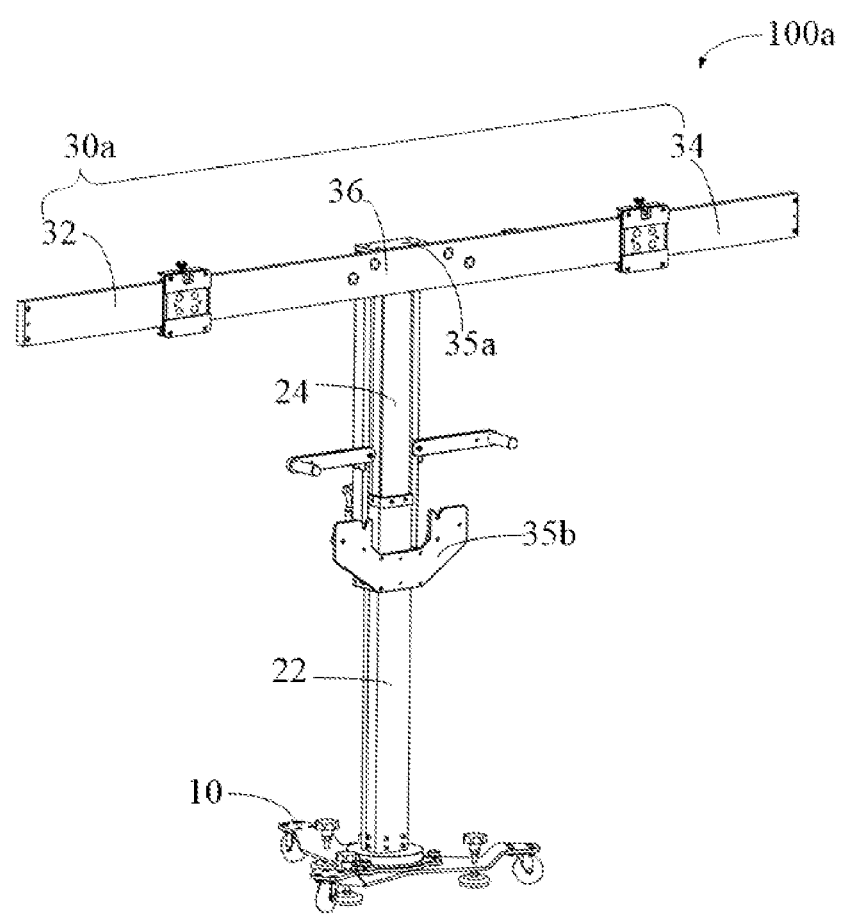
FIG. 14 is a stereogram of a calibration support provided by another embodiment of the present application, wherein the calibration support comprises a movable vertical rod, a first mounting seat, a second mounting seat, and a cross beam, the movable vertical rod being elevated, and the cross beam being mounted to the first mounting seat.
Figure 15:
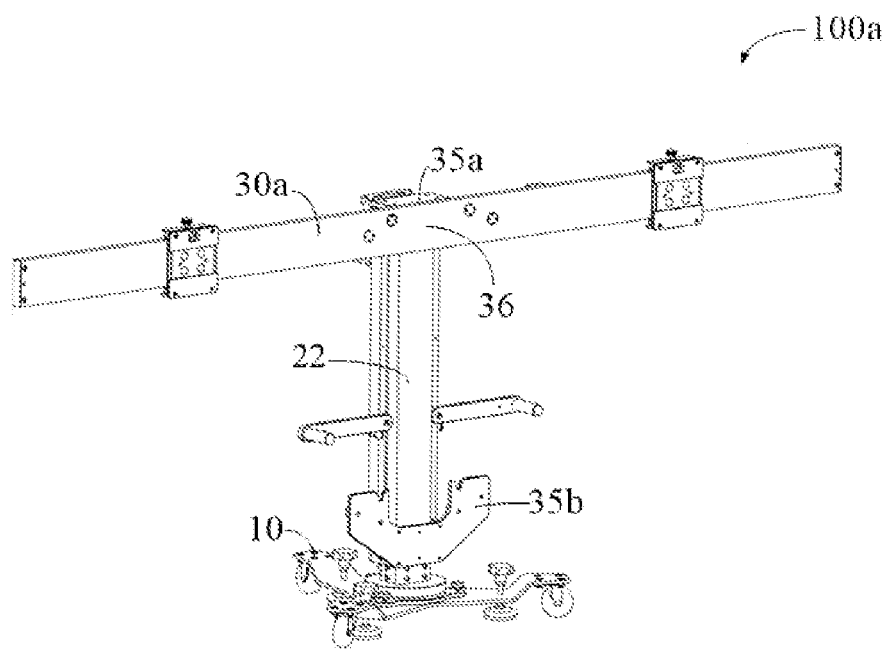
FIG. 15 is a stereogram of the calibration support shown in FIG. 14 in another state, wherein the cross beam is mounted to the first mounting seat and the movable vertical rod is lowered.
Figure 16:
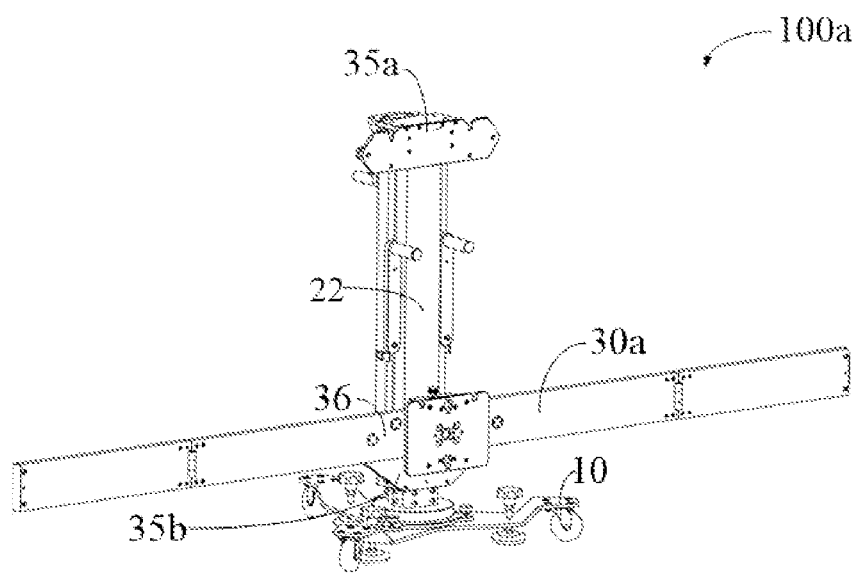
FIG. 16 is a stereogram of the calibration support shown in FIG. 14 in another state, wherein the cross beam is mounted to the second mounting seat and the movable vertical rod is lowered.

Referring to FIGS. 14, 15, and 16 together, another embodiment of the present application provides a calibration support 100a that is substantially identical to the calibration support provided by the previous embodiments, the main difference being that the cross beam 30a of the calibration support 100a can be mounted in at least one position of a first position of the movable vertical rods 24 and a second position of the fixed vertical rods 22 so that the calibration element mounted on the cross beam 30a can be located at different heights so as to be adapted to more systems in an advanced assistant driver system of a vehicle.

The vertical frame assembly in the present embodiment includes the movable vertical rod 24 and the fixed vertical rod 22, which can be referred to the description of the above embodiments and will not be described in detail.

Several mounting seats for mounting the cross beam 30a to the vertical frame assembly 20a will now be introduced based on the mounting position of the cross beam 30a on the vertical frame assembly 20a. As shown in FIG. 15 and FIG. 16, the mounting seat 35a mounted to the movable vertical rod 24 and the mounting seat 35b mounted to the fixed vertical rod 22 will be introduced below, respectively. Of course, in connection with the above-described embodiments, as shown in FIG. 8, the cross beam 30a may also be mounted to the movable vertical rod 24 via the aforementioned mounting seat. The present embodiment introduces another mounting seat as the first mounting seat 35a, that is, the first mounting seat 35a is a mounting seat for mounting the cross beam 30a to the first position of the movable vertical rod 24. Similarly, the second mounting seat 35b is a mounting seat for mounting the cross beam 30a to a second position of the fixed vertical rod 22. It will be understood that the introduction of the mounting seat in the embodiments of the present application is exemplary only, and that any structure of a mounting seat capable of mounting the cross beam 30a to a particular position is within the scope of the present application.

The first position is higher than the second position, or it is understood that the position of the first mounting seat 35a is higher than the position of the second mounting seat 35b so that the cross beam 30a moves in the vertical direction, i.e. in the length direction of the fixed vertical rods 22, in two different height ranges. When the cross beam 30a is mounted to the first position, it moves along the vertical direction within the first height range, and the cross beam can be used to mount a calibration element for calibrating a system with a high mounting position on a vehicle, such as a pattern plate used for calibrating an image acquisition device mounted to the upper portion of a front car window in a lane keeping system; when the cross beam 30a is mounted to the second position, it moves along the vertical direction within the second height range, and the cross beam 30a can be used for mounting a calibration element for calibrating a system with a low mounting position on a vehicle, such as a radar reflector for calibrating a radar mounted near two headlight positions of the vehicle in adaptive cruise control. The cross beam 30a moves in the first height range or the second height range for adapting to different systems on vehicles of different vehicle types. The mounting heights of elements in the systems on each vehicle are different due to the different vehicle types.

Alternatively, in some embodiments of the present application, the first mounting seat 35a and the second mounting seat 35b can be mounted to the movable vertical rod 24 at the same time; if the movable vertical rod 24 is sleeved in the fixed vertical rod 22, the second mounting seat 35a can be accommodated in the fixed vertical rod 22; after the movable vertical rod 24 moves out of the fixed vertical rod 22 in the vertical direction, the second mounting seat 35b can be unfolded and used so as to provide a mounting function; or the first mounting seat 35a and the second mounting seat 35b can be simultaneously mounted to the fixed vertical rod 22; or one mounting seat is detachably mounted to any one position of the movable vertical rod 24 or the fixed vertical rod 22; namely, the position of the mounting seat enables the cross beam 30a to move in two height ranges, and its design is within the scope of the present application.

When the cross beam 30a is mounted to the first mounting seat 35a, the cross beam 30a is in the first position. When the cross beam 30a is mounted to the second mounting seat 35b, the cross beam 30a is in the second position.

In some embodiments, the first mounting seat 35a may be provided at the end of the movable vertical rod 24 remote from the base 10, also understood as the top of the movable vertical rod 24. The assembly manner of the cross beam 30a and the first mounting seat 35a can adopt the sleeving manner as described in the previous embodiments. However, in practical use, the cross beam 30a needs to be frequently assembled with and dismounted from the mounting seat so that adopting a sleeving mounting manner is cumbersome. Based on this, unlike the previous embodiments, the present embodiment designs that the cross beam 30a and the mounting seat are assembled in a hitching manner so that the process of assembling and dismounting the connecting portion and the mounting seat is more convenient and fast.

The cross beam 30a includes a first cross beam 32a, a second cross beam 34, and a connecting portion 36. Two ends of the connecting portion 36 are respectively connected to the first cross beam 32 and the second cross beam 36, and both the first cross beam 32 and the second cross beam 34 can rotate relative to the connecting portion 36 to fold the cross beam 30a, and the folded cross beam 30a is convenient for transportation and carrying.

Figure 17:
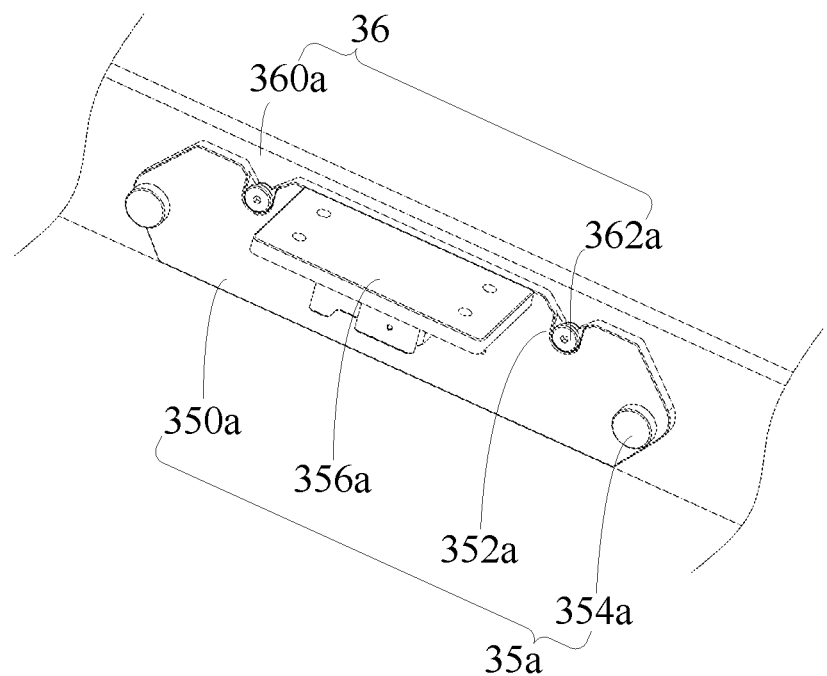
FIG. 17 is a partially enlarged view of the calibration support shown in FIG. 14, primarily showing the portion of the cross beam assembled with the mounting seat.
Figure 18:
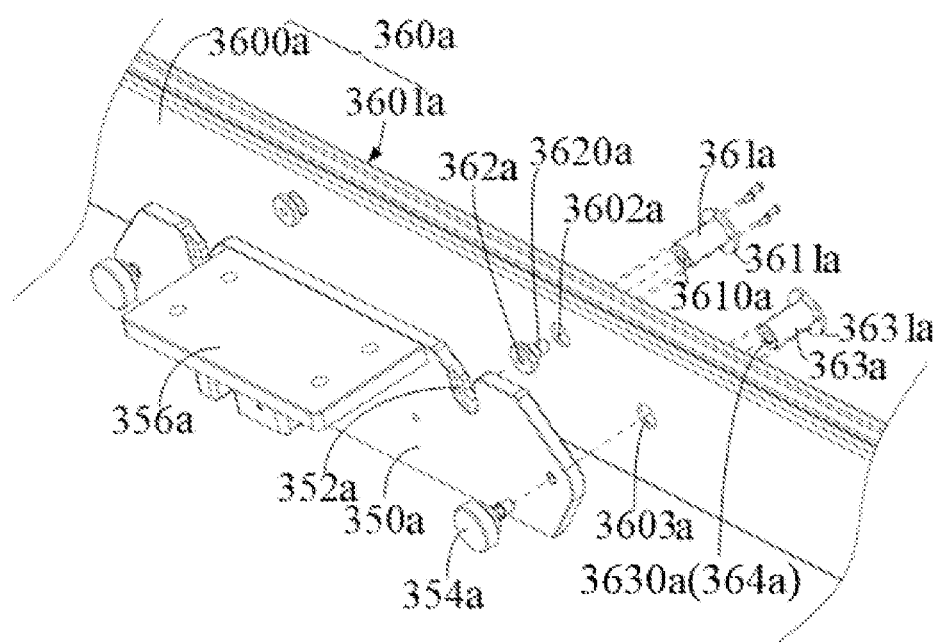
FIG. 18 is a partially exploded view of the portion shown in FIG. 17, primarily showing assembly processes of the cross beam and the mounting seat respectively.
Figure 19:
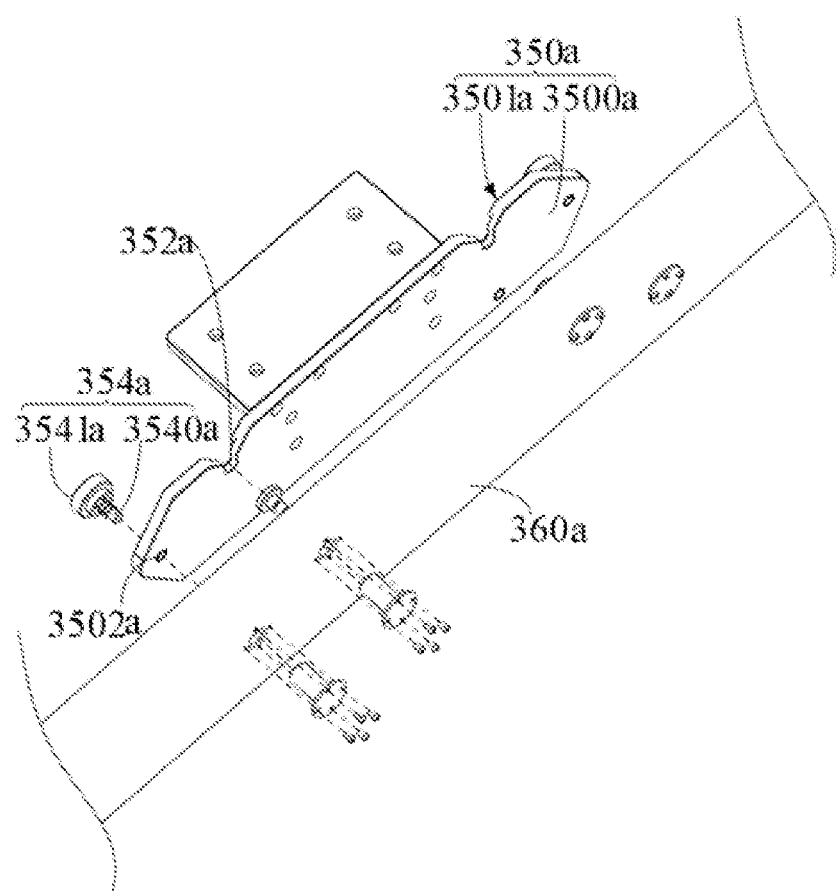
FIG. 19 is a partially exploded view from another angle of the calibration support of FIG. 17.

It will be understood that the first cross beam 32, the second cross beam 34, and the connecting portion 36 may be integrally formed according to practical situations, and it is not limited herein. Referring to FIGS. 17, 18, and 19 together, the connecting portion 36 includes a connecting portion main body 360a, a hook portion 362a, and a screw hole portion 364a. The connecting portion main body 360a includes the first contact face 3600a and the first mounting face 3602a opposite to each other. The first contact face 3600a is used to contact the first mounting seat 35a or the second mounting seat 35b.

The hook portion 362a protrudes from the first contact face 3600a, and the hook portion 362a is used to hitch to the first mounting seat 35a or the second mounting seat 35b to keep the cross beam 30a fixed with the first mounting seat 35a or the second mounting seat 35b.

The hook portion 362a may be a T-shaped hook to prevent the cross beam 30a from being horizontally separated after the cross beam 30a is hitched to the hook portion 362a.

The connecting portion main body 360 is formed with a first mounting hole 3602a penetrating through the first contact face 3600a and the first mounting face 3601a. One end of the first reinforcing sleeve 361a is inserted into the first mounting hole 3602a from one side that the first mounting face 3601a faces, and the other end of the first reinforcing sleeve 361a is formed with a first flange 3611a, which can be fixed to the first mounting face 3601a by a screw. A first screw hole 3610a is formed at one end of the first reinforcing sleeve 361a inserted into the first mounting hole 3602a. The hook portion 362a is formed with a stud 3620a that is threadedly engaged with the first screw hole 3610a to fix the hook portion 362a to the connecting portion main body 360a. The screw hole portion 364a is recessed in the first contact face 3600a, and as shown in FIG. 18, the screw hole portion 364a is used to be threadedly connected to the first mounting seat 35a or the second mounting seat 35b so as to further keep the cross beam 30a fixed with the first mounting seat 35a or the second mounting seat 35b.

The connecting portion 360 is formed with a second mounting hole 3603a penetrating through the first contact face 3600a and the first mounting face 3601a. One end of the second reinforcing sleeve 363a is inserted into the second mounting hole 3603a from one side that the first mounting face 3601a faces, and the other end of the second reinforcing sleeve 363a is formed with a second flange 3631a, which can be fixed to the first mounting face 3601a by a screw. A second screw hole 3630a is formed at one end of the second reinforcing sleeve 363a inserted into the second mounting hole 3603a, and the second screw hole 3630a constitutes the screw hole portion 364a.

The first mounting seat 35a includes a mounting seat main body 356a, a hanging plate portion 350a, a hitching portion 352a, and a knob stud member 354. The mounting seat main body 356a has a horizontal plate-like configuration and is mounted to the top of the movable vertical rod 22. The mounting seat main body 356a may be fixed to the top of the movable vertical rod 24 by a screw so as to fix the first mounting seat 35a to the movable vertical rod 24.

The hanging plate portion 350a is connected to the mounting seat main body 356a, and the hanging plate portion 350a includes a second contact face 3500a and a second mounting face 3502a opposite to each other. The second contact face 3500a is used to contact the first contact face 3600a. The hanging plate portion 356a is formed with a through hole 3502a penetrating through the second contact face 3500a and the second mounting face 3501a for mounting the knob stud member 354a.

The hitching portion 352a is recessed in the second contact face 3500a, and the hitching portion 352a is adapted to the hook portion 362a for hitching the hook portion 362a.

The hitching portion 352a extends to the top of the hanging plate portion 350a, and in this way, the connection between the hitching portion 352a and the hanging plate portion 350a is more stable; when it is required to hitch the hook portion 362a and the hitching portion 352a, the cross beam 30a is lifted to a position where the hook portion 362a is located above the hitching portion 352a, and the hook portion 362a and the hitching portion 352a can be hitched by laying down the cross beam 30a; when it is required to separate the hook portion 362a from the hitching portion 352a, the cross beam 30a is lifted, which facilitates the mounting of the cross beam 30a. The manner in which the hitching portion 352a is connected to the hanging plate portion 350a may have various other manners, such as a connection by a threaded fastener or by a clamping mechanism, which will not be limited by the embodiments of the present application.

The hitching portion 352a may be a T-shaped groove that adapts to a T-shaped hook.

The knob stud member 354a includes a knob portion 3541a and a stud portion 3540a. The knob portion 3541a is located on one side that the second mounting face 3501a faces. One end of the stud portion 3540a is connected to the knob portion 3541a, and the other end of the stud portion 3540a is inserted into the through hole 3502a. The knob stud member 354a can move relative to the hanging plate portion 350a in the length direction of the stud portion 3540a, and can rotate relative to the hanging plate portion 350a in the length direction of the stud portion 3540a. The stud portion 3540a is adapted to the screw hole portion 364a for inserting into and threadedly engaging with the screw hole portion 364a.

The knob stud member 354a may be a captive screw to prevent it from separating from the hanging plate portion 350a.

It will be understood that the hanging plate portion 350a may be omitted according to the actual situation, and at this time, both the hitching portion 352a and the knob stud member 354a may both be provided directly on the mounting seat main body 356a.

When the connecting portion 36 is assembled with the first mounting seat 35a, firstly, the hook portion 362a is hitched to the hitching portion 352a, and the first contact face 3600a is kept in contact with the second contact face 3500a. Next, the nut portion 3541a of the knob stud member 354a is screwed such that the stud portion 3540a of the knob stud member 354a is inserted into and threadably engaged with the screw hole portion 364a.

A second mounting seat 35b is mounted to the fixed vertical rod 22, the second mounting seat 35b being similar in structure to the first mounting seat 35a. The second mounting seat 35b may comprise a mounting seat main body, a hanging plate portion, a hitching portion, and a knob stud member. The connection relationship between the second mounting seat 35b and the cross beam can be referred to the first mounting seat 35a, and the description thereof will not be repeated herein; the difference from the first mounting seat 35a lies in that the mounting seat main body of the second mounting seat 35b is in the shape of a sleeve which is sleeved outside the fixed vertical rod 22 so that the second mounting seat 35b can move in the vertical direction relative to the fixed vertical rod 22.

It will be understood that the second mounting seat 35b and the cross beam 30a may be connected in a different manner than the first mounting seat and the cross beam according to practical requirements, which will not be limited by the embodiments of the present application.

Alternatively, when the first mounting seat 35a is mounted to the movable vertical rod 24 and the second mounting seat 35b is mounted to the fixed vertical rod 22, the first mounting seat 35a and the second mounting seat 35b may be connected by a connecting mechanism, and the second mounting seat 35b is provided outside the fixed vertical rod 22 so that when the movable vertical rod 24 moves relative to the base 10 along the length direction of the fixed vertical rod 22, the first mounting seat 35a and the second mounting seat 35b are driven to move relative to the base 10 along the length direction of the fixed vertical rod 22.

In this manner, a synchronous movement of the first mounting seat 35a and the second mounting seat 35b can be achieved by one driving mechanism, thereby simplifying the structure and volume of the calibration support 100a. Alternatively, in the case where the first mounting seat 35a and the second mounting seat 35b are mounted with the cross beam 30a at the same time, that is, in the case where the first mounting seat 35a and the second mounting seat 35b are mounted with two cross beams 30a, respectively, the change in the heights of the two cross beams 30a can be made coincident, and the two cross beams 30a can be adapted to multiple advanced driver assistant systems of one vehicle type, without adjusting the height position of the cross beam 30a multiple times, thereby simplifying the calibration operation.

In some embodiments, the second mounting seat 35b can move independently from the first mounting seat 35a and the movable vertical rod 24. For example, the case that the second mounting seat 35b is movable relative to the connecting mechanism, where the connecting mechanism serves to guide the second mounting seat 35b to move in the vertical direction. Or the first mounting seat 35a may move independently from the second mounting seat 35b or a movable vertical rod. For example, the case that the first mounting seat 35a moves relative to a connecting mechanism, which guides the first mounting seat 35a to move in the vertical direction. Alternatively, the first mounting seat 35a and the second mounting seat 35b may be independently mounted to the vertical frame assembly, without being connected by a connecting mechanism, thereby enabling independent movement.

In some embodiments, the connecting mechanism may comprise a connecting rod arranged in the vertical direction, where the vertical direction may be understood as the length direction of the vertical rod when the vertical frame assembly is used in calibration, the connecting rod connecting the first mounting seat 35a with the second mounting seat 35b together.

In some embodiments, the first mounting seat 35a and the second mounting seat 35b are fixedly connected to the connecting rod, respectively. Depending on the actual circumstances, in some other embodiments, the first mounting seat 35a or the second mounting seat 35b may also move relative to the connecting rod. The first mounting seat 35a is taken as an example, for example, the case that the first mounting seat 35a and the connecting rod are fixed only along the length direction of the fixed vertical rod 22. For another example, the case that the first mounting seat 35a may be fixed or movable relative to the connecting rod so that the position between the first mounting seat 35a and the second mounting seat 35b is adjustable. The same applies to the second mounting seat 35b.

Figure 20:
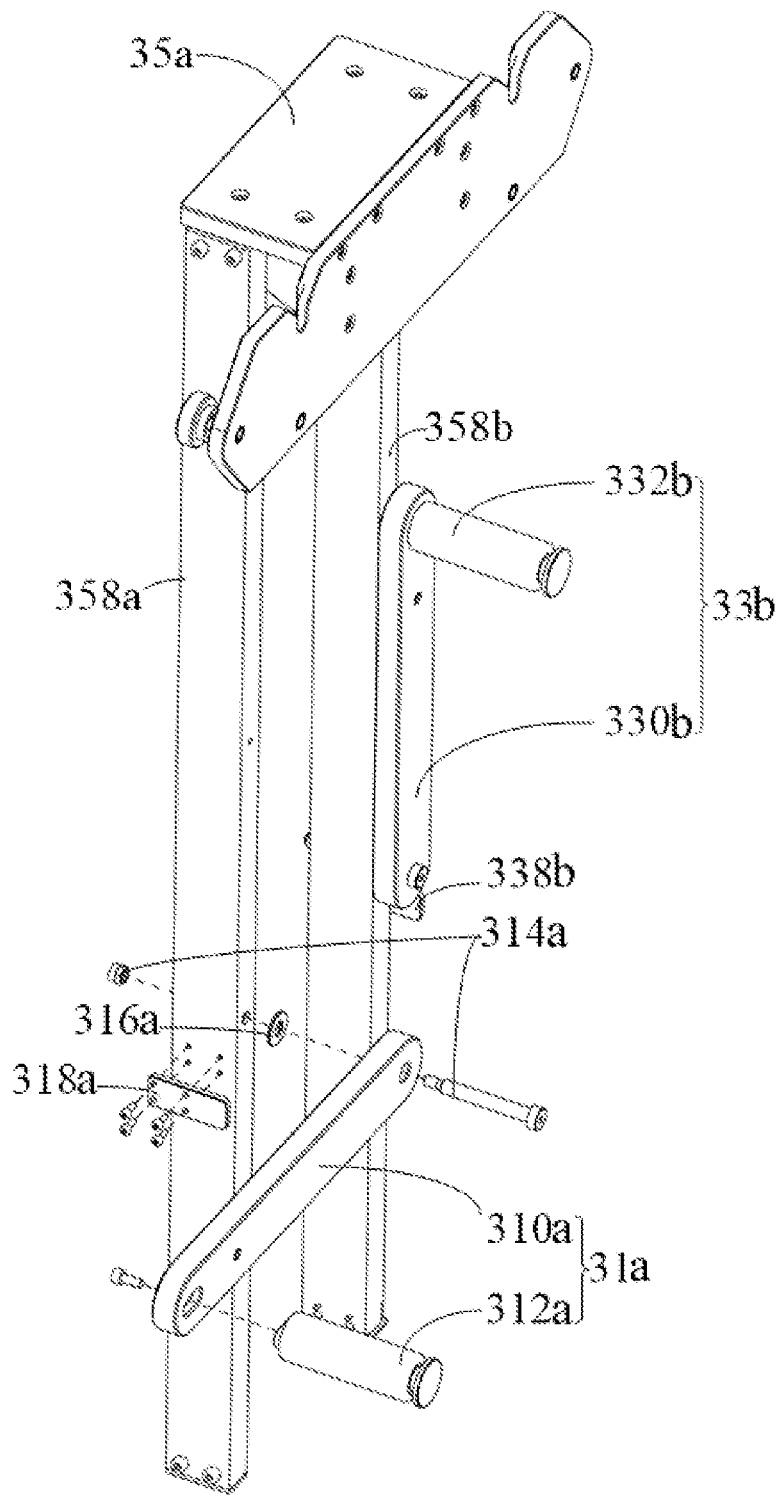
FIG. 20 is a stereogram of an assembly of the first mounting seat, the bearing rod member, and the connecting rod of the calibration support shown in FIG. 14.

In some embodiments, as shown in FIG. 20, the connecting rod includes a first connecting rod 358a and a second connecting rod 358b. The two ends of any one connecting rod of the first connecting rod 358a and the second connecting rod 358b are respectively connected to the first mounting seat 35a and the second mounting seat 35b; the first connecting rod 358a and the second connecting rod 358b are both arranged in the vertical direction and are respectively arranged at two horizontal sides of the vertical frame assembly, and the first connecting rod 358a and the second connecting rod 358b are substantially parallel; of course, the first connecting rod 358a and the second connecting rod 358b may not be arranged in parallel in practical applications, which will not be limited by the embodiments of the present application.

It will be understood that the number of connecting rods in the connecting mechanism is not limited, and it suffices that the connecting rods can bear the force of the connection between the first mounting seat 35a and the second mounting seat 35b; the specific implementation in the connecting mechanism can be different from the connecting rod, for example, the case that the connecting rod is replaced with a connecting plate, and the first mounting seat 35a and the second mounting seat 35b can be respectively connected via two ends of the connecting plate, or the connecting mechanism surrounds the fixed vertical rod 22 therein, so as to ensure the stable connection of the first mounting seat 35a and the second mounting seat 35b; of course, with regard to other implementations in the connecting mechanism, they are within the scope of the present application as long as the first mounting seat 35a and the second mounting seat 35b can be connected.

The cross beam 30a may be used directly to mount a calibration element, or may be used to mount a calibration element in conjunction with auxiliary tools, such as support rods, fixed blocks, sliding blocks, and the like as described in the previous embodiments.

Figure 21:
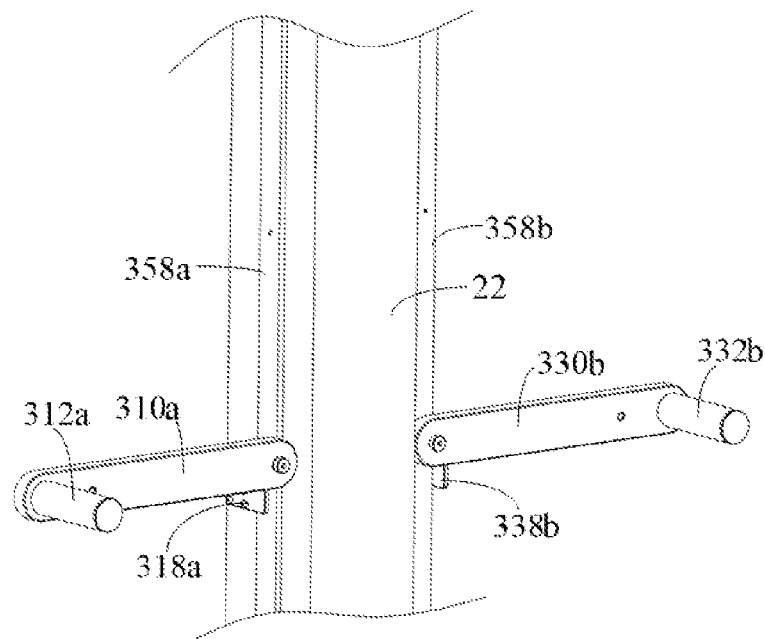
FIG. 21 is a partially enlarged view of the assembly shown in FIG. 20 mounted in a calibration support, wherein a support rod is unfolded.
Figure 22:
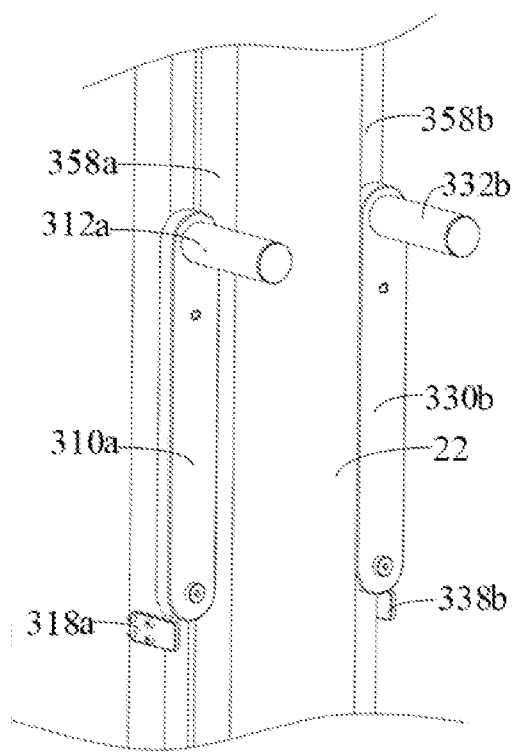
FIG. 22 is a partially enlarged view showing another state of the assembly shown in FIG. 20 mounted in the calibration support, wherein the support rod is folded with a connecting rod.
Figure 23:
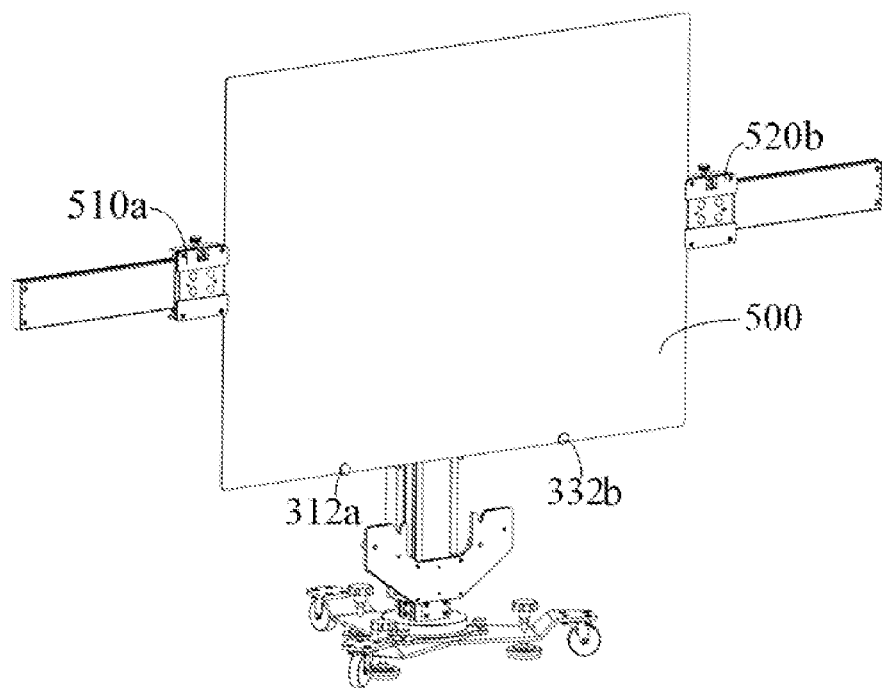
FIG. 23 is a stereogram of a calibration system according to yet another embodiment of the present application, wherein the calibration system includes a calibration element and a calibration support, the calibration element being a pattern plate.

Referring to FIGS. 20, 21, and 22 together, the connecting mechanism is provided with a bearing rod member provided between the first mounting seat 35a and the second mounting seat 35*b* for cooperating with the cross beam so as to support a pattern plate 500 in the calibration element, the pattern plate 500, as shown in FIG. 23, being used for calibrating an image sensor in an advanced driver assistant system of the vehicle.

The bearing rod member is pivotable relative to the connecting mechanism such that the end of the bearing rod member is located in at least two positions. When the end of the bearing rod member is in one of the at least two positions, it is used to bear the pattern plate.

The bearing rod member may include a first bearing rod member 31*a* and the second bearing rod member 33*b*. The first bearing rod member 31*a* and the second bearing rod member 33*b* are both provided on the connecting mechanism. When the movable vertical rod 24 moves relative to the fixed vertical rod 22 along the length direction of the fixed vertical rod 22, the first bearing rod member 31*a* and the second bearing rod member 33*b* move together with the movable vertical rod 24.

The first bearing rod member 31*a* is mounted to the first connecting rod 358*a*. The top end of the first connecting rod 358*a* is connected to the first mounting seat 35*a*, the bottom end of the first connecting rod 358*a* is connected to the second mounting seat 35*b*, and the first bearing rod member 31*a* is mounted to the middle of the first connecting rod 358*a*.

The first bearing rod member 31*a* includes a first rod member body 310*a* and a first bearing portion 312*a*. One end of the first rod member body 310*a* is mounted to the first connecting rod 358*a*, and the other end of the first rod member body 310*a* is mounted to the first bearing portion 312*a*. The first bearing rod member 31*a* is rotatable relative to the first connecting rod 358*a* to unfold the first rod member body 310*a* to be parallel to the cross beam 30*a* or to be folded with the first connecting rod 358*a*.

The first rod member body 310*a* and the first connecting rod 358*a* are mounted together by a first threaded fastener 314*a*, and the first rod member body 310*a* and the first connecting rod 358*a* are contacted by a first elastic gasket 316*a*. By adjusting the first threaded fastener 314*a*, the degree to which the first rod member body 310*a* and the first connecting rod 358*a* squeeze the first elastic gasket 316*a* can be changed so as to change the rotational damping of the first bearing rod member 31*a*. The first bearing rod member 31 can remain fixed relative to the first connecting rod 358*a* without the first bearing rod member 31 being subjected to an external force.

The first connecting rod 358*a* is mounted with a first locking block 318*a*. When the first rod member body 310*a* is unfolded to be parallel to the cross beam 30*a*, the first locking block 318*a* supports the first rod member body 310*a*, and the first rod member body 310*a* can be kept unfolded to be parallel to the cross beam 30*a* regardless of whether the first bearing rod member 31*a* is subjected to an external force.

Similarly, the second bearing rod member 33*b* is mounted to the first mounting seat 35*a* by the second connecting rod 358*b*. The top end of the second connecting rod 358*b* is connected to the first mounting seat 35*a*, the bottom end of the second connecting rod 358*b* is connected to the second mounting seat 35*b*, and the second bearing rod member 33*b* is mounted to the middle of the second connecting rod 358*b*.

The second bearing rod member 33*b* includes a second rod member body 330*b* and a second support member 332*b*. One end of the second rod member body 330*b* is mounted to the second connecting rod 358*b*, and the other end of the second rod member body 330*b* is mounted to the second bearing portion 332*b*. The second bearing rod member 33*b* is rotatable relative to the second connecting rod 358*b* to make the second rod member body 330*b* unfold to be parallel to the cross beam 30*a* or fold with the second connecting rod 358*b*.

The second connecting rod 358*b* is mounted with a second locking block 338*b*. When the second rod member body 330*b* unfolds to be parallel to the cross beam 30*a*, the second locking block 338*b* supports the second rod member body 330*b* to keep the second rod member body 330*b* unfolded to be parallel to the cross beam 30*a*.

The second rod member body 330*b* and the second connecting rod 358*b* are mounted together by a second threaded fastener, and the second rod member body 330*b* and the second connecting rod 358*b* are contacted by a second elastic gasket. By adjusting the second threaded fastener, the degree to which the second rod member body 330*b* and the first connecting rod 358*b* squeeze the second elastic gasket can be changed so as to change the rotational damping of the second bearing rod member 33*b*. The second bearing rod member 33*b* can remain fixed relative to the second connecting rod 358*b* without the second bearing rod member 33*b* being subjected to an external force.

The second connecting rod 358*b* is mounted with a second locking block 338*b*. When the second rod member body 330*b* is unfolded to be parallel to the cross beam 30*a*, the second locking block 338*b* supports the second rod member body 330*b*, and the second rod member body 330*b* can be kept unfolded to be parallel to the cross beam 30*a* regardless of whether the second bearing rod member 33*b* is subjected to an external force.

The first bearing portion 312*a* extends in the same direction as the second bearing portion 332*b*. It will be understood that one of the first bearing rod member 31*a* and the second bearing rod member 33*b* may be omitted according to actual needs.

Figure 24:
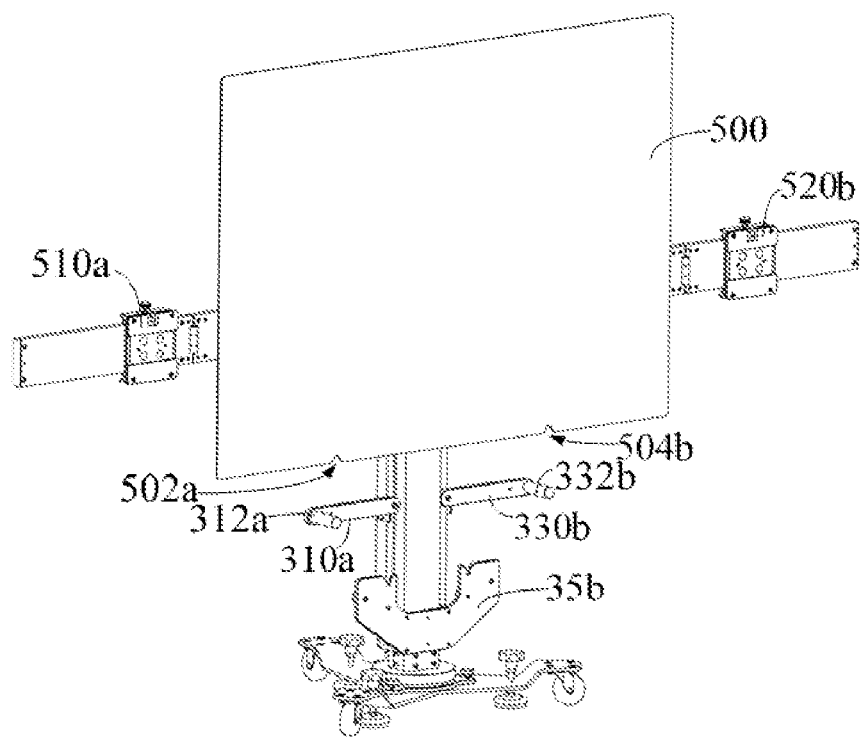
FIG. 24 is an exploded view of the calibration system shown in FIG. 23, primarily illustrating an assembly process of the pattern plate and the calibration support.

Referring to FIGS. 23 and 24 together, when the first rod member body 310*a* is unfolded to be parallel to the cross beam 30*a* and the second rod member body 330*b* is unfolded to be parallel to the cross beam 30*a*, the first bearing portion 312*a* and the second bearing portion 332*b* may be used together to support a calibration element such as a pattern plate 500.

The first bearing portion 312*a* is formed with a first engaging groove 314*a*, and the second bearing portion 332*b* is formed with a second locking groove (not shown in the figure, reference can be made to the first engaging groove). When the first bearing portion 312*a* and the second bearing portion 332*b* support the pattern plate 500 together, the first engaging groove 314*a* and the second engaging groove 314*b* engage together with the bottom of the pattern plate 500 to prevent the pattern plate 500 from overturning forward, and six degrees of freedom of the pattern plate 500 are fixed under the function of gravity. It will be understood that one of the first engaging groove 314*a* and the second engaging groove may be omitted according to the actual situation.

Figure 26:
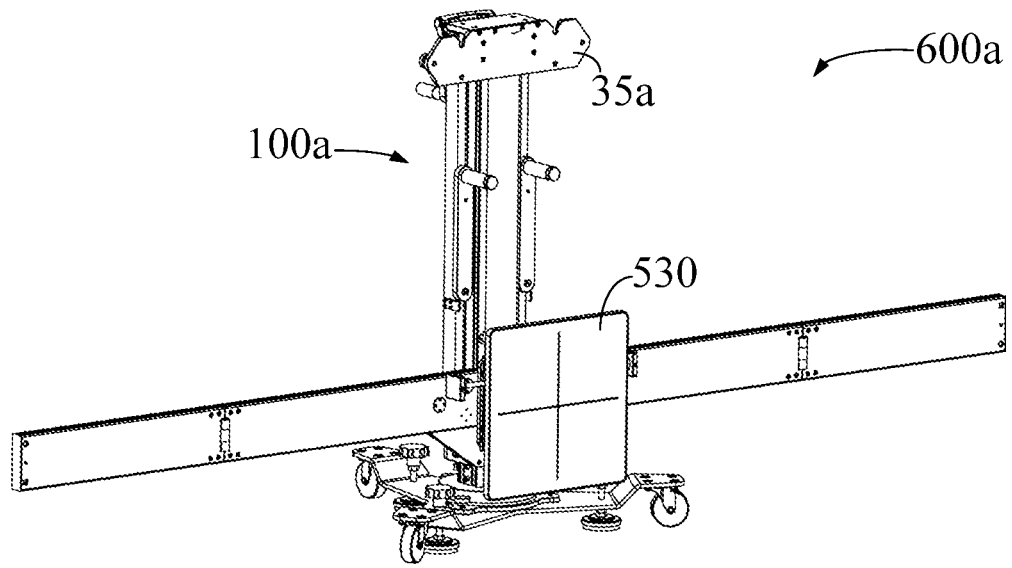
FIG. 26 is a stereogram of another state of the calibration system shown in FIG. 23, wherein the calibration element is a radar calibration device.

Referring to FIG. 26 together, further, when the cross beam 30*a* is mounted to the first mounting seat 35*a*, the cross beam 30*a* may be mounted with a sliding assembly including a first sliding assembly 510*a* and a second sliding assembly 520*b*. Both the first sliding assembly 510*a* and the second sliding assembly 520*b* are movable relative to the cross beam 30*a* along the length direction of the cross beam 30*a* for cooperative clamping of the pattern plate 500. The first sliding assembly 510*a* and the second sliding assembly 520*b* are respectively formed with a first engagement groove 512*a* and a second engagement groove (not shown in the figure, reference can be made to the first engagement groove). When the first sliding assembly 510a and the second sliding assembly 520b cooperate to clamp the pattern plate 500, the first engagement groove 512a and the second engagement groove are respectively engaged with the two side portions of the pattern plate 500, further preventing the pattern plate 500 from overturning forward, and further fixing the six degrees of freedom of the pattern plate 500 under the action of gravity. It will be understood that one of the first engagement groove 512a and the second engagement groove may be omitted according to the actual situation.

In some embodiments, unlike the previous embodiments, both the first guide rail and the second guide rail on the cross beam 30a are omitted. The cross beam 30a has a plate-like configuration as a whole, and the first sliding assembly 510a and the second sliding assembly 520b are mounted to the cross beam 30a by gripping the cross beam 30a.

One of the first sliding assembly and the second sliding assembly may be omitted. For example, the case that both the first sliding assembly 510a and the second sliding assembly 520b are configured to be removable from the cross beam 30a.

The sliding assembly may be used for mounting a calibration element.

Figure 28:
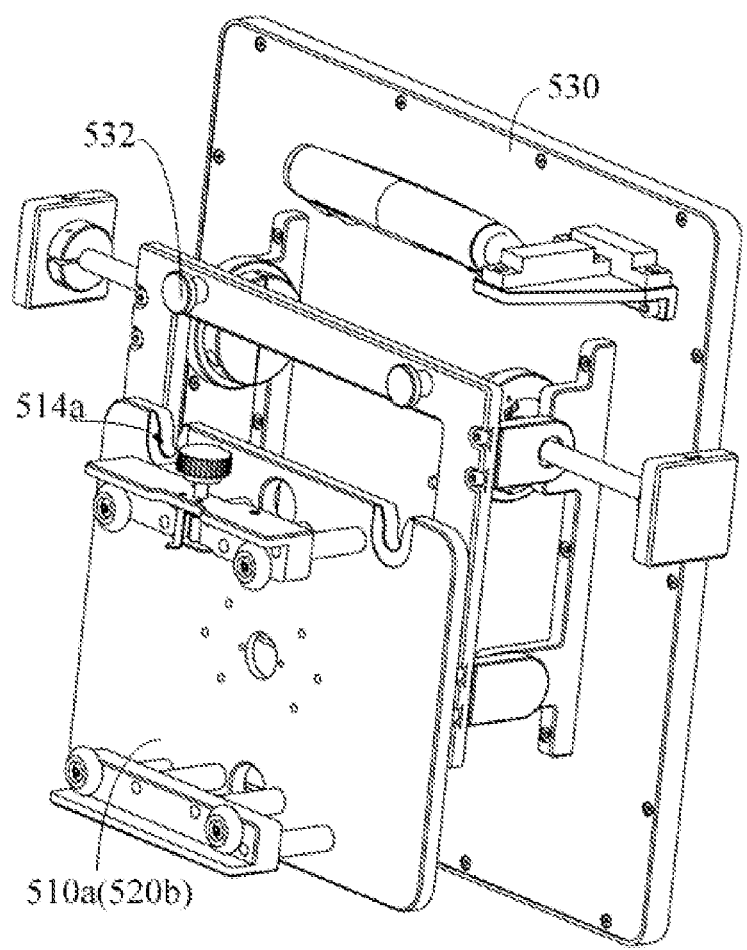
FIG. 28 is a partially exploded view of the portion shown in FIG. 27, primarily showing a process during which the radar calibration device is assembled with the calibration support.

In an alternative embodiment, the sliding assembly, i.e. the first sliding assembly 510a or the second sliding assembly 520b, is formed with a hitching groove 514a for hitching the calibration element. The hitching groove 514a, as shown in FIGS. 28 and 29, may be a T-shaped groove.

With reference to FIGS. 23-28, yet another embodiment of the present application provides a calibration system 600a that includes a calibration element and the calibration support 100a of the embodiments described above, the calibration element being mountable to the calibration support 100a.

As shown in FIGS. 23 and 24, the calibration support 100a can be used for mounting a pattern plate 500 when the cross beam 30a is mounted to the first mounting seat 35a.

The pattern plate 500 and the calibration support 100a are mounted in the following manner: after the cross beam 30a is mounted to the first mounting seat 35a, the first rod member body 310a is unfolded to be parallel to the cross beam 30a, and the second rod member body 330b is unfolded to be parallel to the cross beam 30a. The pattern plate 500 is placed on the first bearing portion 312a and second bearing portions 332b such that the two collectively support the pattern plate 500. When the first bearing portion 312a and the second bearing portion 332b support the pattern plate 500 together, the first engaging groove 314a of the first bearing portion 312a and the second engaging groove of the second bearing portion 332b both engage with the bottom of the pattern plate 500.

Figure 25:
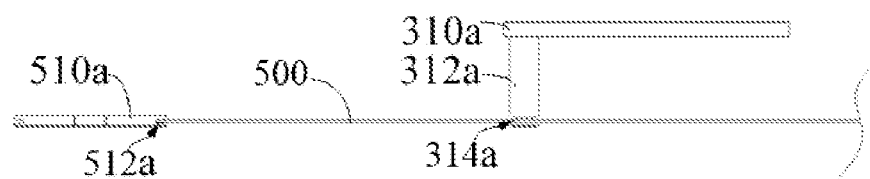
FIG. 25 is a partially enlarged view of the calibration system shown in FIG. 23, primarily showing a structure where the pattern plate is assembled with the calibration support.

As shown in FIG. 25, in some alternative embodiments, the bottom of the pattern plate 500 is formed with a first fixed groove 502a and a second fixed groove 504b. When the first bearing portion 312a and the second bearing portion 332 jointly support the pattern plate 500, the first fixed groove 502a is engaged with the first engaging groove 314a of the first bearing portion 312a, and the second fixed groove 504b is engaged with the second engaging groove of the second bearing portion 332b, further improving the anti-toppling ability of the pattern plate 500.

After the first bearing portion 312a and the second bearing portion 332b collectively support the pattern plate 500, the pattern plate 500 may be cooperatively locked by the first sliding assembly 510a and the second sliding assembly 520. When the first sliding assembly 510a and the second sliding assembly 520b clamp the pattern plate 500, the first engagement groove 512a of the first sliding assembly 510a and the second engagement groove of the second sliding assembly 520b are both engaged with the side portion of the pattern plate 500.

As shown in FIG. 26, when the cross beam 30a is mounted to the second mounting seat 35b, the calibration support 100a may be used for mounting a radar calibration device 530 for calibrating a radar of an advanced driver assistant system of a vehicle. The radar calibration device may be a radar reflecting plate, a radar calibration box, a corner reflector, etc. In the illustration, the radar calibration device 530 is a radar reflecting plate.

The radar calibration device 53 may be mounted directly to the cross beam 30a. The radar calibration device 530 is formed with a hook body 532, and the hook body 532 can be directly hitched to the hitching groove 314a of the cross beam 30a.

It will be understood that the radar calibration device 53 may also be mounted to the cross beam 30a in other ways, e.g. by screws, according to practical requirements, which will not be limited by the present application.

Figure 27:
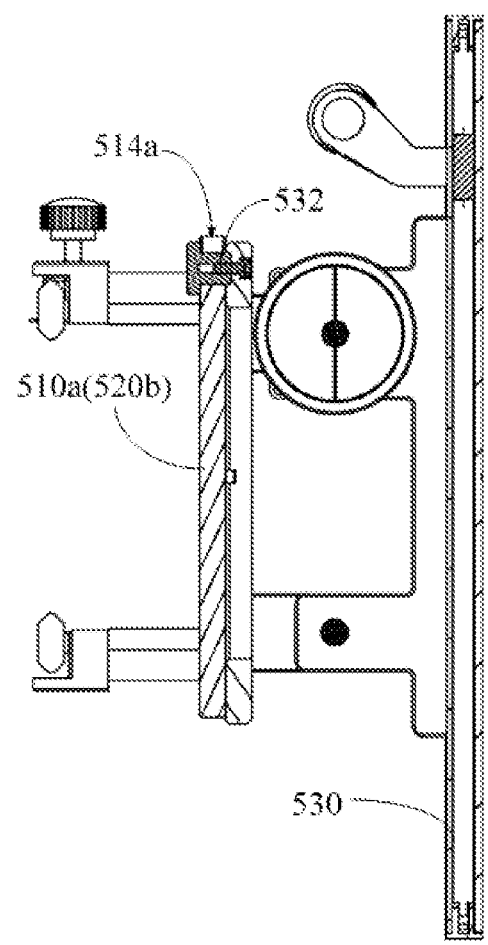
FIG. 27 is a partially enlarged view of the calibration system shown in FIG. 26, primarily showing the structure where the radar calibration device is assembled with the calibration support.

As shown in FIGS. 27 and 28, in some embodiments of the present application, the radar calibration device 53 is mounted to the sliding assembly so that the radar calibration device 530 can move with the sliding assembly along the length direction of the cross beam 30 to adjust the horizontal position of the radar calibration device 530. The hook body 532 of the radar calibration device 53 can be hitched to the hitching groove of the sliding assembly.

It will be understood that the radar calibration plate 530 may also be mounted to the sliding assembly by bolting according to practical requirements, which will not be limited by the present application.

In comparison with the prior art, in the calibration support 100a and the calibration system 600a of the embodiments of the present application, the cross beam 30a of the calibration support 100a can be mounted in at least one of two positions of the vertical frame assembly, and the heights of the two positions are different, and the cross beam 30a can be lifted and lowered in different height ranges, so as to expand the lifting and lowering range of the calibration support 100a.

Finally, it should be noted that: the above embodiments are merely illustrative of the technical solutions of the present application, rather than limiting thereto; combinations of technical features in the above embodiments or in different embodiments are also possible within the idea of the present application, and the steps can be implemented in any order, and there are many other variations of the different aspects of the present application as described above, which are not provided in detail for the sake of brevity; although the present application has been described in detail with reference to the foregoing embodiments, those of ordinary skills in the art will appreciate that: the technical solutions disclosed in the above-mentioned embodiments can still be modified, or some of the technical features can be replaced by equivalents; such modifications and substitutions do not depart the essence of corresponding technical solutions from the scope of the technical solutions of various embodiments of the present application.

The invention claimed is:
1. A calibration support, comprising:
   a base;
   a vertical frame assembly comprising a fixed vertical rod and a movable vertical rod; wherein the fixed vertical rod is mounted to the base, and the movable vertical rod can move relative to the base in a preset range along a length direction of the fixed vertical rod; and a cross beam assembly detachably mounted to one of a first mounting seat and a second mounting seat connected to the movable vertical rod, the cross beam assembly for mounting a calibration element, and the calibration element for calibrating an advanced driver assistant system of a vehicle;

wherein a position of the first mounting seat is higher than the position of the second mounting seat;

when the movable vertical rod moves relative to the base along the length direction of the fixed vertical rod, the first mounting seat and the second mounting seat are driven to move relative to the base along the length direction of the fixed vertical rod;

wherein the cross beam assembly comprises a connecting portion main body and a hook portion, the hook portion protruding from the connecting portion main body;

either one of the first mounting seat and the second mounting seat comprises a mounting seat main body mounted and a hitching portion, wherein the mounting seat main body is mounted to the vertical frame assembly, the hitching portion is connected to the mounting seat main body, and the hitching portion is adapted to the hook portion for the hook portion to be hitched.

2. The calibration support according to claim 1, wherein the movable vertical rod is sleeved in the fixed vertical rod and the first mounting seat is provided at an end of the movable vertical rod remote from the base;

the first mounting seat and the second mounting seat are connected via a connecting mechanism, and the second mounting seat is arranged outside the fixed vertical rod, so that when the movable vertical rod moves relative to the base along the length direction of the fixed vertical rod, the first mounting seat and the second mounting seat are driven to move relative to the base along the length direction of the fixed vertical rod.

3. The calibration support according to claim 2, wherein the connecting mechanism comprises a connecting rod along the length direction of the fixed vertical rod.

4. The calibration support according to claim 3, wherein the first mounting seat and the second mounting seat are respectively fixedly connected to the connecting rod; or
the first mounting seat is movable relative to the connecting rod; or
the second mounting seat is movable relative to the connecting rod.

5. The calibration support according to claim 1, wherein either the first mounting seat or the second mounting seat further comprises a hanging plate portion connected to the mounting seat main body, the hitching portion being recessed in the hanging plate portion.

6. The calibration support according to claim 1, wherein the hitching portion extends to a top of the hanging plate portion.

7. The calibration support according to claim 1, wherein the connecting portion main body is formed with a first mounting hole therethrough;

one end of a first reinforcing sleeve is inserted into the first mounting hole and is formed with a first screw hole, the other end of the first reinforcing sleeve is formed with a first flange, and the first flange is fixed to the connecting portion main body;

the hook portion is formed with a stud, and the stud is screwed with the first screw hole to fix the hook portion on the connecting portion main body.

8. The calibration support according to claim 1, wherein the hook portion is a T-shaped hook.

9. The calibration support according to claim 1, wherein the cross beam assembly further comprises a screw hole portion, the screw hole portion being recessed in the connecting portion main body;

either one of the first mounting seat and the second mounting seat further includes a knob stud member mounted to the hanging plate portion, the knob stud member being used for screwing with the screw hole portion.

10. The calibration support according to claim 2, wherein the connecting mechanism is provided with a bearing rod member provided between the first mounting seat and the second mounting seat, the bearing rod member cooperating with the cross beam assembly to support a pattern plate in the calibration element, and the pattern plate being used for calibrating an image sensor in an advanced driver assistant system of the vehicle.

11. The calibration support according to claim 10, wherein the bearing rod member is pivotable relative to the connecting mechanism such that the end of the bearing rod member is located in at least two positions, wherein when the end of the bearing rod member is in one of the at least two positions, it is used to bear the pattern plate.

12. The calibration support according to claim 11, wherein the connecting mechanism comprises a connecting rod along the length direction of the fixed vertical rod, the bearing rod member being mounted to the connecting rod.

13. The calibration support according to claim 12, wherein the bearing rod member comprises a rod member body and a bearing portion, one end of the rod member body being mounted to the connecting rod, and the other end of the rod member body being mounted to the bearing portion, and the bearing rod member being rotatable relative to the connecting rod so that the rod member body is unfolded to be parallel to the cross beam assembly or folded with the connecting rod;

when the rod member body is unfolded to be parallel to the cross beam assembly, the bearing portion supports the pattern plate.

14. A calibration support, comprising:
a base;
a vertical frame assembly mounted to the base, the vertical frame assembly being arranged in a vertical direction;
wherein the vertical frame assembly comprises a fixed vertical rod and a movable vertical rod, the fixed vertical rod being mounted to the base, and the movable vertical rod being movable in the vertical direction relative to the fixed vertical rod;
and a cross beam assembly mounted in at least one of a first position of the movable vertical rod and a second position of the movable vertical rod which can be received in the fixed vertical rod, and movable in the vertical direction relative to the vertical frame assembly; the first position being higher than the second position;
wherein the cross beam assembly is used for mounting a calibration element which is for calibrating an advanced driver assistant system of a vehicle;
wherein the cross beam assembly comprises a connecting portion main body and a hook portion, the hook portion protruding from the connecting portion main body;

either one of the first mounting seat and the second mounting seat comprises a mounting seat main body mounted and a hitching portion, wherein the mounting seat main body is mounted to the vertical frame assembly, the hitching portion is connected to the mounting seat main body, and the hitching portion is adapted to the hook portion for the hook portion to be hitched.

15. The calibration support according to claim 14, wherein the cross beam assembly comprises two cross beams for mounting the calibration element;

and the two of the cross beams are mounted at the first position and the second position, respectively.

16. A calibration support, comprising:

a base;

a vertical frame assembly mounted to the base, the vertical frame assembly being arranged in a vertical direction;

wherein the vertical frame assembly comprises a fixed vertical rod and a movable vertical rod, the fixed vertical rod being mounted to the base, and the movable vertical rod being movable in the vertical direction relative to the fixed vertical rod;

a first mounting seat mounted to the movable vertical rod and movable in the vertical direction relative to the base;

a second mounting seat mounted to the movable vertical rod and positioned on the fixed vertical rod and movable in the vertical direction relative to the base; a position of the first mounting seat being higher than the position of the second mounting seat;

and a cross beam assembly detachably mounted to one of the first mounting seat and the second mounting seat for mounting a calibration element, the calibration element being used for calibrating an advanced driver assistant system of a vehicle;

wherein the cross beam assembly comprises a connecting portion main body and a hook portion, the hook portion protruding from the connecting portion main body;

either one of the first mounting seat and the second mounting seat comprises a mounting seat main body mounted and a hitching portion, wherein the mounting seat main body is mounted to the vertical frame assembly, the hitching portion is connected to the mounting seat main body, and the hitching portion is adapted to the hook portion for the hook portion to be hitched.

17. The calibration support according to claim 16, wherein the cross beam assembly comprises two cross beams, and the two of the cross beams are mounted to the first mounting seat and the second mounting seat respectively.

18. The calibration support according to claim 17, wherein the two cross beams are mounted to the first mounting seat and the second mounting seat, respectively, by means of hitching.

* * * * *